(12) United States Patent
Nakamoto et al.

(10) Patent No.: US 10,488,641 B2
(45) Date of Patent: Nov. 26, 2019

(54) SCANNING MICROSCOPE

(71) Applicant: OLYMPUS CORPORATION, Hachioji-shi, Tokyo (JP)

(72) Inventors: Chika Nakamoto, Tokyo (JP); Yosuke Tani, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 255 days.

(21) Appl. No.: 15/629,539

(22) Filed: Jun. 21, 2017

(65) Prior Publication Data

US 2018/0003938 A1 Jan. 4, 2018

(30) Foreign Application Priority Data

Jun. 30, 2016 (JP) ................................. 2016-130702

(51) Int. Cl.
*G02B 21/00* (2006.01)
*G01B 11/25* (2006.01)

(52) U.S. Cl.
CPC ...... *G02B 21/0084* (2013.01); *G01B 11/2518* (2013.01); *G02B 21/0048* (2013.01)

(58) Field of Classification Search
CPC ........ G01Q 10/00; G01Q 20/00; G01Q 30/00; G01B 9/04
See application file for complete search history.

(56) References Cited

U.S. PATENT DOCUMENTS

| | | | | |
|---|---|---|---|---|
| 4,971,445 A * | 11/1990 | Sato | ......................... | G01B 9/04 250/559.22 |
| 5,028,799 A * | 7/1991 | Chen | ..................... | G01B 11/24 250/559.23 |
| 5,361,313 A * | 11/1994 | O'Keefe | ................ | G01D 5/344 250/227.11 |
| 6,547,355 B1 * | 4/2003 | Shimada | ................ | B41J 2/2132 347/12 |
| 6,703,614 B1 * | 3/2004 | Stifter | .................... | G01Q 10/02 250/306 |
| 2003/0189703 A1 * | 10/2003 | Yonezawa | .......... | G01N 21/8806 356/237.2 |
| 2004/0119001 A1 * | 6/2004 | Almogy | ............. | G01N 21/8806 250/234 |
| 2004/0263741 A1 * | 12/2004 | Koyama | .............. | G09G 3/3233 349/139 |
| 2007/0171411 A1 * | 7/2007 | Corson | .............. | G01N 21/6428 356/318 |
| 2008/0024826 A1 * | 1/2008 | Kakutani | ............. | H04N 1/4051 358/3.06 |
| 2008/0185533 A1 * | 8/2008 | Kimura | ................ | G02B 21/002 250/458.1 |

(Continued)

FOREIGN PATENT DOCUMENTS

JP 2011123142 A 6/2011
JP 2016009157 A 1/2016

*Primary Examiner* — Pankaj Kumar
*Assistant Examiner* — Timothy R Newlin
(74) *Attorney, Agent, or Firm* — Holtz, Holtz & Volek PC

(57) ABSTRACT

A scanning microscope includes a two-dimensional scanning device that includes a first scanner and a second scanner for scanning, in oscillation motion and with light, a sample in directions orthogonal to each other, the first scanner scanning the sample at a speed higher than a speed of the second scanner, and a scan controller that controls the two-dimensional scanning device.

10 Claims, 25 Drawing Sheets

(56) References Cited

U.S. PATENT DOCUMENTS

| | | | | |
|---|---|---|---|---|
| 2009/0116707 A1* | 5/2009 | Sutko | .................. | G06K 9/00134 382/128 |
| 2009/0161203 A1* | 6/2009 | Kempe | .................... | G01B 9/04 359/368 |
| 2010/0100990 A1* | 4/2010 | Trumper | ................ | G01Q 10/04 850/8 |
| 2011/0139873 A1* | 6/2011 | Sprenger | ............. | G01D 5/2492 235/436 |
| 2013/0254948 A1* | 9/2013 | Hartong | ................. | H01J 37/28 850/1 |
| 2013/0314385 A1* | 11/2013 | Kim | ..................... | G09G 3/3225 345/204 |
| 2013/0335531 A1* | 12/2013 | Lee | ........................ | G01B 11/25 348/46 |
| 2014/0152793 A1* | 6/2014 | Staker | ................. | G02B 21/361 348/79 |
| 2015/0041646 A1* | 2/2015 | Suematsu | ............... | H01J 37/20 250/307 |
| 2016/0100179 A1* | 4/2016 | He | ....................... | H04N 19/176 375/240.25 |
| 2016/0150948 A1* | 6/2016 | Shimamoto | ........ | A61B 1/00009 600/109 |
| 2016/0156914 A1* | 6/2016 | Suehring | ................ | H04N 19/70 375/240.12 |
| 2016/0252717 A1* | 9/2016 | Iwase | .................. | G02B 21/367 348/79 |
| 2018/0024035 A1* | 1/2018 | Khosla | ..................... | G01N 3/56 356/35.5 |
| 2018/0269026 A1* | 9/2018 | Hoque | ................ | G02B 21/002 |

\* cited by examiner

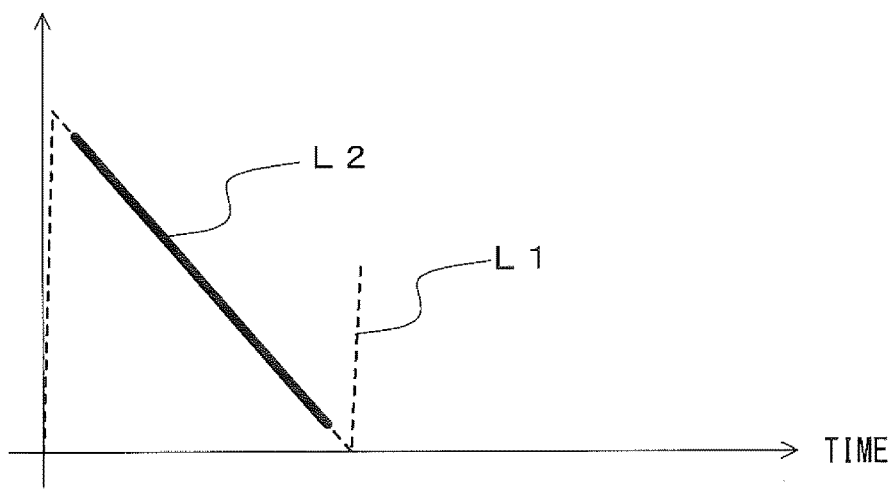
F I G. 6

SCANNING MICROSCOPE

CROSS REFERENCE TO RELATED APPLICATIONS

This application is based upon and claims the benefit of priority from prior Japanese Patent Application No. 2016-130702, filed Jun. 30, 2016, the entire contents of which are incorporated herein by this reference.

BACKGROUND OF THE INVENTION

Field of the Invention

The present disclosure is related to a scanning microscope.

Description of the Related Art

Conventionally, as a device for obtaining a three-dimensional information of a subject, laser scanning microscopes such as a confocal microscope etc. are known. For example, laser scanning microscopes used for industrial purposes can measure the three-dimensional shape of a subject such as a semiconductor, a nano material, etc. in a contactless manner.

As a general rule, laser scanning microscopes can obtain an image of a subject at resolution that is higher than resolution achieved by optical microscopes that use a CCD image sensor, a CMOS image sensor, etc. Meanwhile, a problem that it takes time to obtain an image for scanning a subject has been pointed out.

As a technique that realizes the obtainment of an image in a short period of time by a laser scanning microscope, reciprocal scan as described in for example Japanese Laid-open Patent Publication No. 2016-009157 is known. A reciprocal scan in a conventional technique is a technique that is used in raster scan, which is a typical scanning method for a laser scanning microscope. Utilizing a reciprocal scan that obtains an image from both the forward movement and the backward movement in the X directions, in which a scan is conducted at a speed higher than in the Y directions, makes it possible to obtain twice as many images in a prescribed period of time without changing the operation frequency of the scanner.

SUMMARY OF THE INVENTION

A scanning microscope according to an aspect of the present invention is a scanning microscope including a two-dimensional scanning device that includes a first scanner and a second scanner for scanning, in oscillation motion and with light, a sample in directions orthogonal to each other, the first scanner scanning the sample at a speed higher than a speed of the second scanner, a scan controller that controls the two-dimensional scanning device, an photodetector that detects light from the sample scanned by the two-dimensional scanning device, and a sampling device that samples a signal from the photodetector in both a forward movement period and a backward movement period of the second scanner.

A scanning microscope according to another aspect of the present invention is a scanning microscope including a two-dimensional scanning device that includes a first scanner and a second scanner for scanning, in oscillation motion and with light, a sample in directions orthogonal to each other, the first scanner scanning the sample at a speed higher than a speed of the second scanner, and a scan controller that controls the two-dimensional scanning device, wherein the scan controller adjusts an output timing for an image validity signal about a scan direction of the second scanner for a drive signal waveform of the second scanner.

A scanning microscope according to still another aspect of the present invention is a scanning microscope including a two-dimensional scanning device that includes a first scanner and a second scanner for scanning, in oscillation motion and with light, a sample in directions orthogonal to each other, the first scanner scanning the sample at a speed higher than a speed of the second scanner, and a scan controller that controls the two-dimensional scanning device, wherein the scan controller adjusts an output timing for an image validity signal about a scan direction of the first scanner for a sampling waveform that represents a temporal change of a frequency of a sampling clock.

BRIEF DESCRIPTION OF THE DRAWINGS

The present invention will be more apparent from the following detailed description when the accompanying drawings are referenced.

FIG. 6 shows a drive signal waveform in a one-way scan in the Y direction;

DESCRIPTION OF THE EMBODIMENTS

In order to increase the speed of obtaining an image in a laser scanning microscope, various techniques including a reciprocal scan described above are proposed. In the field of laser scanning microscopy, there is demand for novel techniques in order to realize further increase in the speed.

[First Embodiment]

Figure 1:
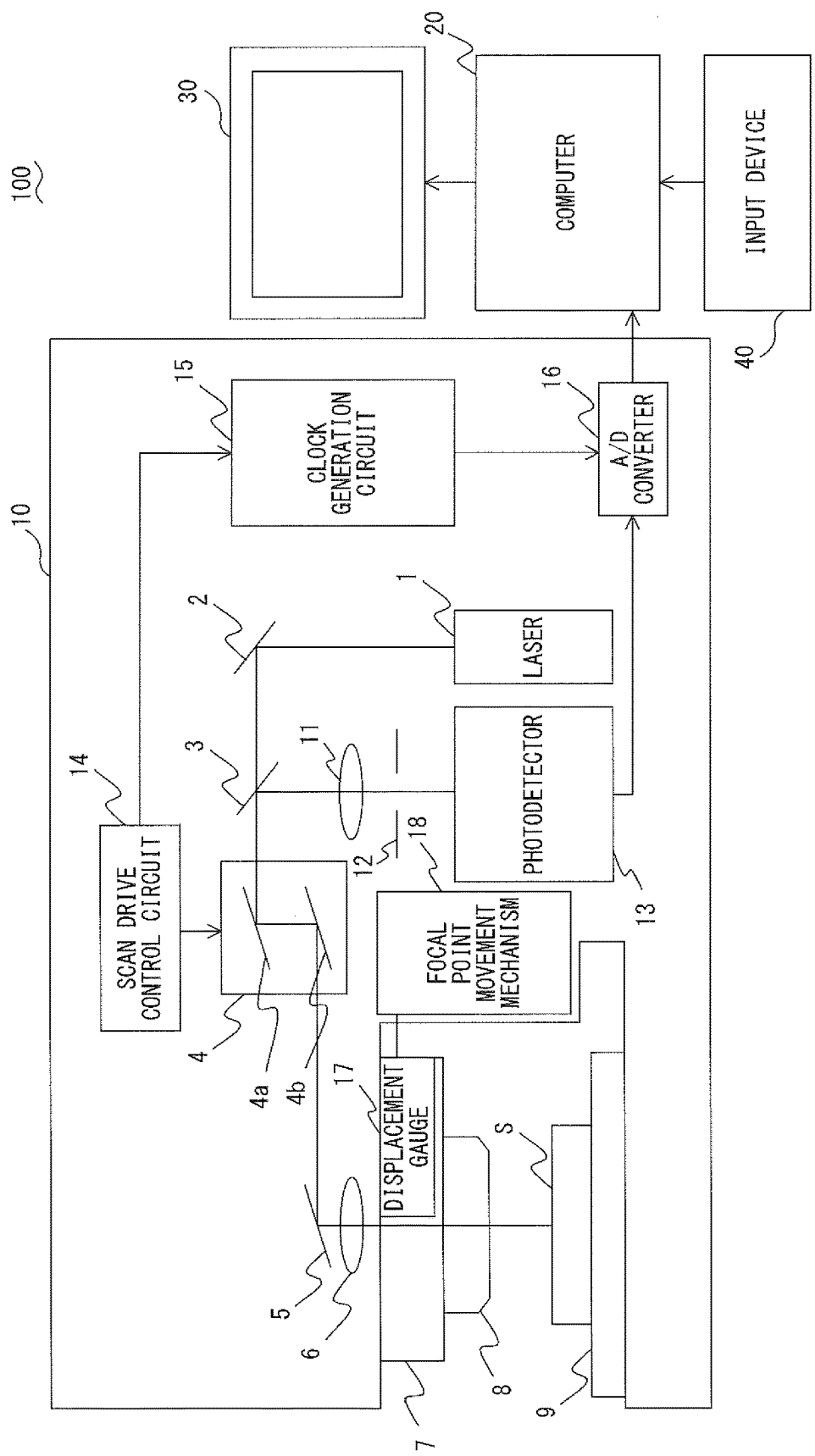
FIG. 1 exemplifies a configuration of a scanning microscope 100 according to the first embodiment.
Figure 2:
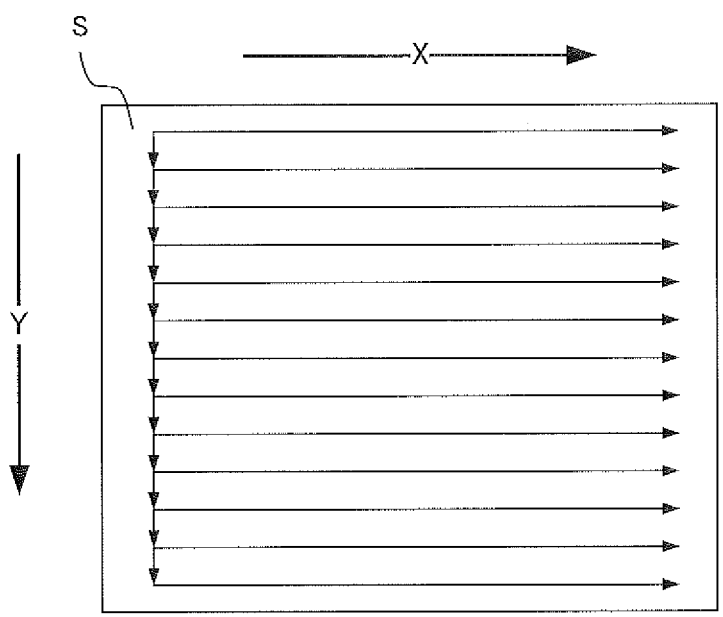
FIG. 2 shows an example of a scanning method performed by the scanning microscope 100.
Figure 3:
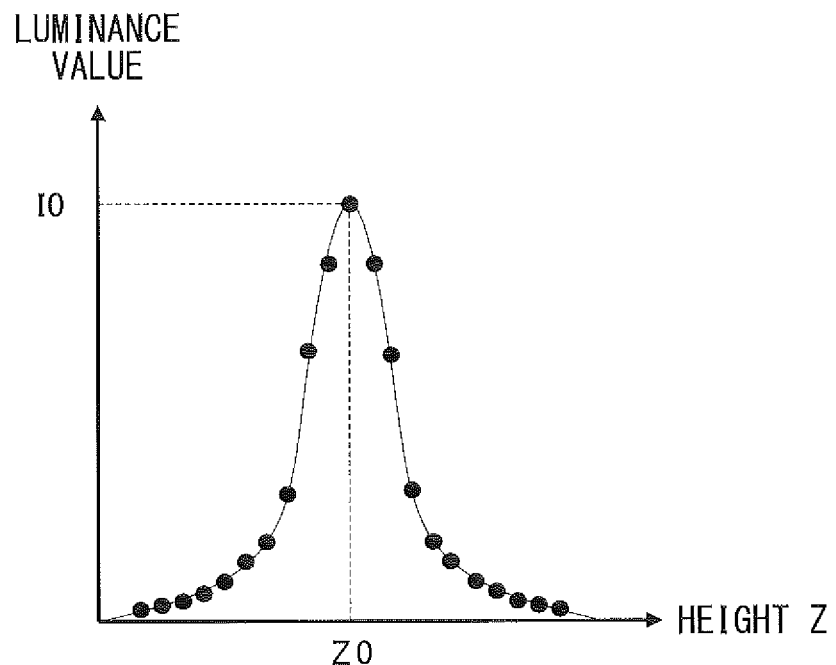
FIG. 3 shows an example of an IZ curve.
Figure 4:
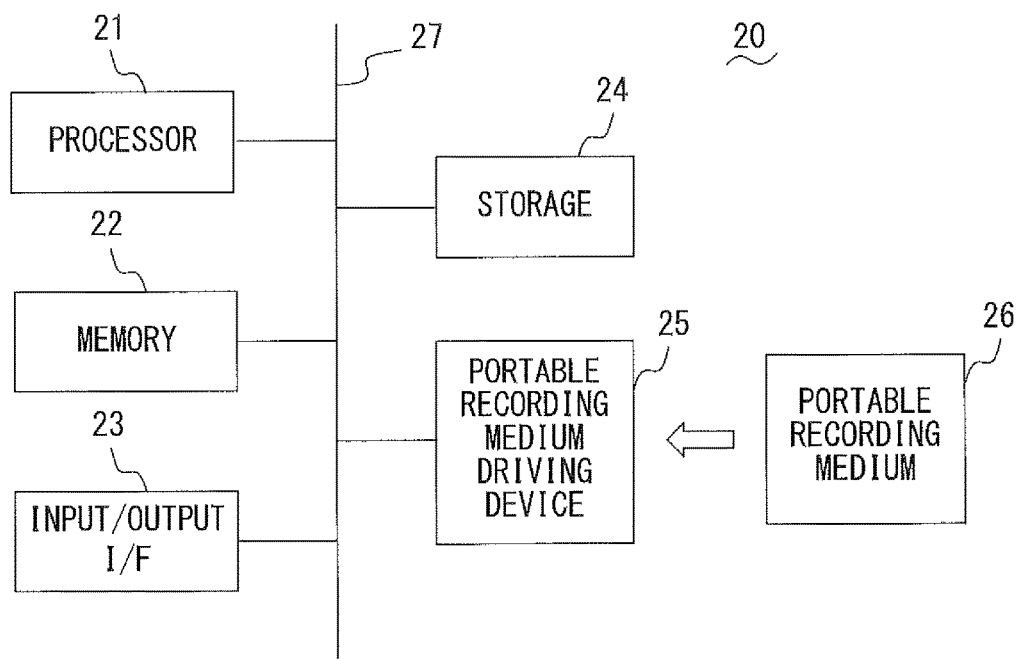
FIG. 4 exemplifies a hardware configuration of a computer 20.

FIG. 1 exemplifies a configuration of a scanning microscope 100 according to the present embodiment. FIG. 2 shows an example of a scanning method performed by the scanning microscope 100. FIG. 3 shows an example of an IZ curve. FIG. 4 exemplifies a hardware configuration of a computer 20 included in the scanning microscope 100.

The scanning microscope 100 is a laser scanning microscope that scans sample S with laser light, and is also a confocal microscope having a confocal optical system. The scanning microscope 100 is used as for example a three-dimensional measurement device that generates height information (including surface roughness information) of sample S. Note that in the present document, a position on sample S at which an optical spot of condensed laser light is formed will be referred to as a scan position, and a trajectory in which an optical spot moves will be referred to as a scan trajectory.

As shown in FIG. 1, the scanning microscope 100 includes a microscope body 10, a computer 20, a display device 30 and an input device 40. The microscope body 10 includes a scanning optical system, a photodetector 13, a scan drive control circuit 14, a clock generation circuit 15, an A/D converter 16, a displacement gauge 17 and a focal point movement mechanism 18. The scanning optical system includes a laser 1, a mirror 2, a half mirror 3, a two-dimensional scanning mechanism 4, a mirror 5, a lens 6, a revolver 7, an objective 8, a stage 9, a lens 11 and a confocal diaphragm 12.

The two-dimensional scanning mechanism 4 is a two-dimensional scanning device including a scanner 4a (first scanner) and a scanner 4b (second scanner) that scan, in oscillation motion and in the directions that are orthogonal to each other, the sample with laser light from the laser 1. The two-dimensional scanning mechanism 4 is controlled by the scan drive control circuit 14. The e scanner 4a is a scanner for scanning sample S in the X directions that are orthogonal to the optical axis of the objective 8, such as a resonant scanner or a galvano scanner. The scanner 4b is a scanner for scanning sample S in the Y directions that are orthogonal to the optical axis of the objective 8 and to the X directions, such as a galvano scanner. In the two-dimensional scanning mechanism 4, the scanner 4a scans sample S at a speed higher than the speed of the scanner 4b.

The confocal diaphragm 12 is a diaphragm formed by a pin hole. The confocal diaphragm 12 is arranged in such a manner that the pin hole is located at a position that is optically conjugate with the front side focal position of the objective 8 in order to block light reflected at a position that is not the front side focal position of the objective 8. For example, the confocal diaphragm 12 is arranged on a rear side focal plane of the lens 11.

The photodetector 13 detects light from sample S scanned by the two-dimensional scanning mechanism 4, and outputs an analog signal in accordance with the detected light intensity. The photodetector 13 is for example a PMT (Photomultiplier Tube).

The scan drive control circuit 14 is a scan controller that controls the two-dimensional scanning mechanism 4, and controls the two-dimensional scanning mechanism 4 so that a raster scan is performed. Hereinafter, a cycle of a line scan that constitutes a raster scan (scan in the X directions in FIG. 2) will be referred to as a scanning cycle. Also, the scan drive control circuit 14 outputs a signal representing a scan timing of the two-dimensional scanning mechanism 4 (which will be referred to as a scan timing signal) to the clock generation circuit 15. A scan timing signal is for example a signal representing a start timing of each line scan in the X directions of the scanner 4a.

The clock generation circuit 15 is a clock generation device (clock generator) that generates a sampling clock and outputs the sampling clock to the A/D converter 16. Note that in this document, a sampling position refers to a scan position at which sampling was performed. Also, a sampling trajectory refers to the trajectory of a sampling position.

The A/D converter 16 is a sampling device that samples an analog signal output from the photodetector 13 so as to output a digital signal in accordance with light intensity detected by the photodetector 13. The digital signal represents the luminance value of a sampling position. The A/D converter 16 may perform A/D conversion on the time integration of an input signal. The A/D converter 16 samples an analog signal in accordance with a sampling clock generated by the clock generation circuit 15. As will be described specifically later, the A/D converter 16 samples a signal from the photodetector 13 in both the forward movement period and the backward movement period of the scanner 4b.

The displacement gauge 17 is a device the that measures a movement amount in the optical axis directions of the objective 8 that moves together with the revolver 7. The displacement gauge 17 is configured to output a movement amount of the objective 8 in the optical axis directions to the computer 20. The focal point movement mechanism 18 is a device that moves the revolver 7 in the optical axis directions. The focal point movement mechanism 18 may be for example a stepping motor or a piezo element. Note that the focal point movement mechanism 18 can be anything that changes a distance between the objective 8 and sample S. For this purpose, the focal point movement mechanism 18 may move the stage 9 instead of the revolver 7 in the optical axis directions. In such a case, the displacement gauge 17 is configured to measure a movement amount of the stage 9 in the optical axis directions. Note that a movement amount corresponds to the Z position, which is a coordinate in the Z directions.

In the microscope body 10, laser light emitted from the laser 1 is reflected by the mirror 2, and enters the mirror 5 via the half mirror 3 and the two-dimensional scanning mechanism 4. Laser light reflected by the mirror 5 in the optical axis direction of the objective 8 is enlarged to a prescribed light flux diameter by the lens 6 so as to form, via the objective 8, an optical spot on sample S that is arranged on the stage 9. Laser light reflected by sample S enters the objective 8 again and enters the half mirror 3 via the lens 6, the mirror 5 and the two-dimensional scanning mechanism 4. Laser light reflected by the half mirror 3 is detected by the photodetector 13 after being condensed by the lens 11 and passing through the pin hole formed in the confocal diaphragm 12.

In the scanning microscope 100, the A/D converter 16 repeats sampling while the two-dimensional scanning mechanism 4 is moving the scan position in the X directions and the Y directions. This makes it possible to obtain a digital signal of each sampling position (i.e., the luminance value of each sampling position) distributed in the two dimensions of the X directions and the Y directions. Further, the above process is repeated each time the focal point movement mechanism 18 moves the scan position in the Z directions. This makes it possible to obtain a digital signal of each sampling position (i.e., the luminance value of each sampling position) distributed in the third dimensions of the X directions, the Y directions and the Z directions.

The computer 20 is an image data generation device (image data generator) that generates scan image data representing a cross-sectional image of sample S on the basis of a digital signal of a sampling position distributed in the two dimensions of the X directions and the Y directions. Also, the computer 20 generates a luminance change curve (which will be referred to as an IZ curve hereinafter) for each pixel area of scan image data on the basis of digital signals of a plurality of sampling positions that are different in the Z directions and the Z position output from the displacement gauge 17. Also, by determining the height of that pixel area on the basis of the IZ curve, the height information of sample S is generated. The computer 20 may determine for example height Z0, which represents maximum luminance value I0 from among the heights at the sampled positions as shown in FIG. 3, as the height of that pixel area. Also, the computer 20 may calculate the shape of the IZ curve so as to determine the height at which the luminance value becomes the local maximum in the IZ curve as the height of that pixel area. In FIG. 3, the black dots represent the sampling results. Further, the computer 20 may generate omnifocal image data in which the entire scan scope is in focus, on the basis of pixel data that corresponds to a height determined for each pixel area.

FIG. 4 exemplifies a hardware configuration of the computer 20. The computer 20 is for example a standard computer. The computer 20 includes a processor 21, a memory 22, an input/output interface 23, a storage 24 and a portable recording medium driving device 25 to which a portable recording medium 26 is inserted, and these elements are connected to each other via a bus 27. Note that FIG. 4 shows an example of a hardware configuration of the computer 20, and the computer is not limited to this configuration.

The processor 21 is for example a CPU (Central Processing Unit), an MPU (Micro Processing Unit), a DSP (Digital Signal Processor), etc., and executes a program so as to perform a programmed process. Note that examples of a programmed process includes for example an image data generation process of generating image data such as scan image, omnifocal image, etc., a height measurement process of generating height information by calculating an IZ curve, or other processes.

The memory 22 is for example a RAM (Random Access Memory), and temporarily stores a program or data recorded in the storage 24 or the portable recording medium 26, when the program is executed. The input/output interface 23 is a circuit that exchanges a signal with devices other than the computer 20 (for example, the A/D converter 16, the display device 30, the input device 40, etc.).

The storage 24 is for example a hard disk or a flash memory, and is used mainly for recording various types of data and programs. The portable recording medium driving device 25 accommodates the portable recording medium 26 such as an optical disk, CompactFlash (registered trademark), etc. The portable recording medium 26 has a function of assisting the storage 24.

The display device 30 is a display that displays an image of sample S on the basis of image data generated by the computer 20. The display device 30 may be for example a liquid crystal display or may be an organic EL display. The display device 30 may display an image of sample S on the basis of the latest image data each time the computer 20 generates image data. Also, the display device 30 may display various types of information other than images of sample S. In addition to images, measurement results, measurement conditions, etc. are displayed on the display device 30.

The input device 40 is an input device for inputting, to the computer 20, an instruction in accordance with manipulation made by the user. The input device 40 is for example a mouse, a keyboard, a touch panel, etc.

Figure 5:
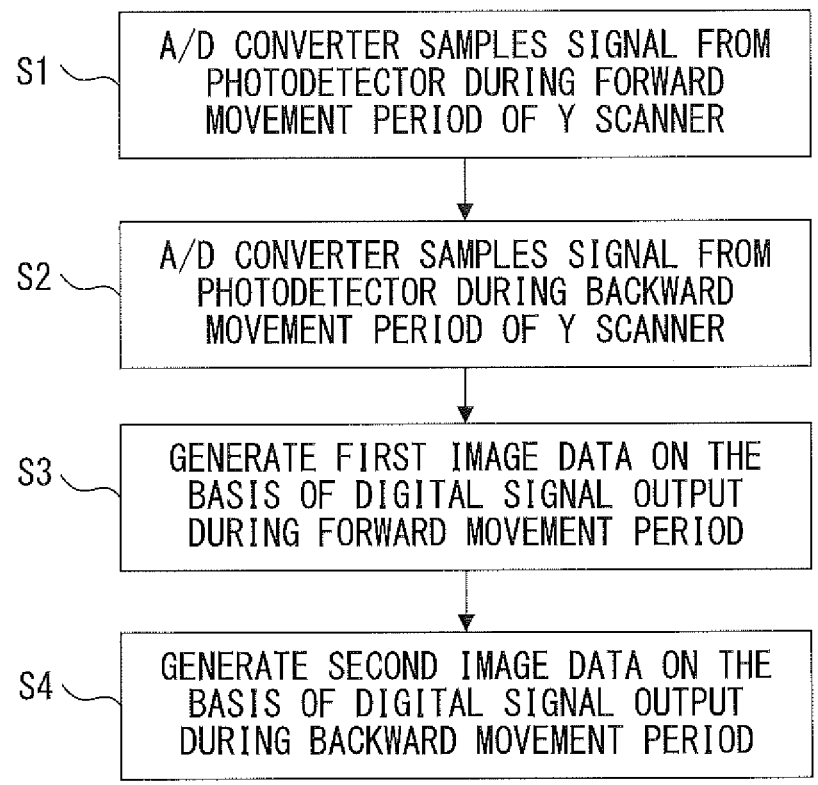
FIG. 5 is a flowchart for a control process of a scanning microscope 100.

FIG. 5 is a flowchart for a control process of the scanning microscope 100. In the scanning microscope 100, the scan drive control circuit 14 controls the two-dimensional scanning mechanism 4 so that the scanner 4b, which performs a scan in the Y directions, performs a reciprocal scan. In this example, a reciprocal scan refers to a scan of sample S performed in both the forward movement and the backward movement. In more detail, the scanning microscope 100 is controlled as shown in FIG. 5. First, the A/D converter 16, which is a sampling device, samples a signal from the photodetector 13 during the forward movement period of the scanner 4b, and outputs the signal to the computer 20 (step S1). Thereafter, the A/D converter 16 samples a signal from the photodetector 13 during the backward movement period of the scanner 4b, and outputs the signal to the computer 20 (step S2). Then, the computer 20 generates one piece of image data (first image data) on the basis of a digital signal output from the A/D converter 16 during the forward movement period of the scanner 4b (step S3). Further, the computer 20 generates another one piece of image data (second image data) on the basis of a digital signal output from the A/D converter 16 during the backward movement period of the scanner 4b (step S4). Thereby, it is possible to reduce time taken to obtain image per image (which will be referred to simply as image obtainment time hereinafter) compared to the conventional techniques.

Figure 7:
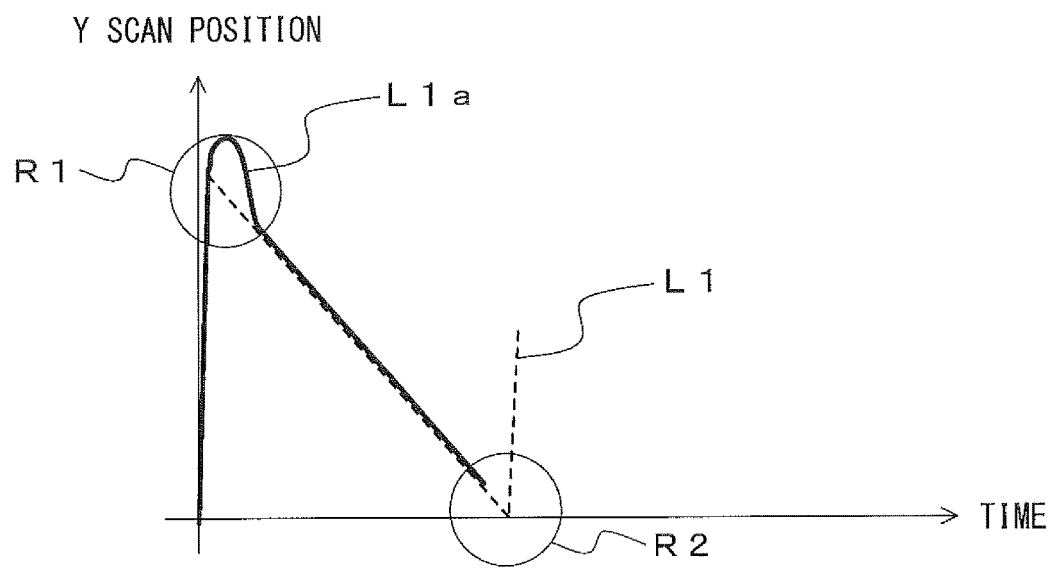
FIG. 7 shows a response character of a scanner in a one-way scan related to the Y direction.
Figure 8:
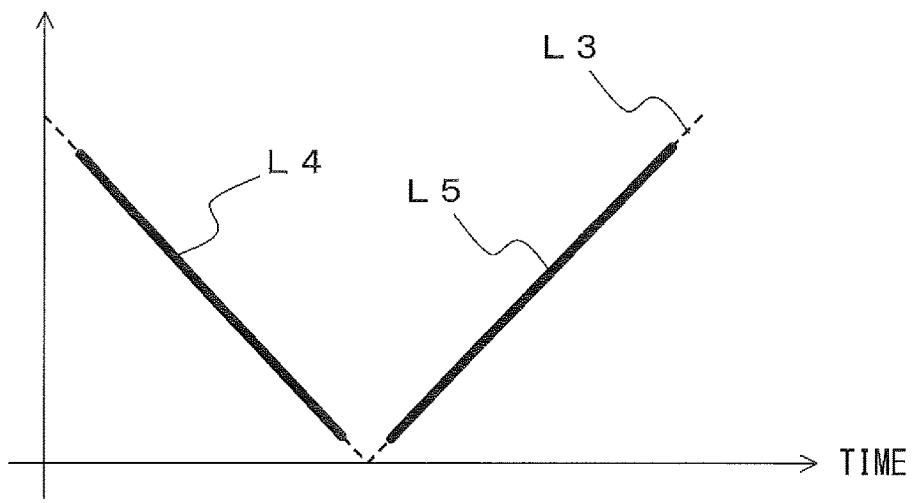
FIG. 8 shows a drive signal waveform in a reciprocal scan in the Y directions.
Figure 9:
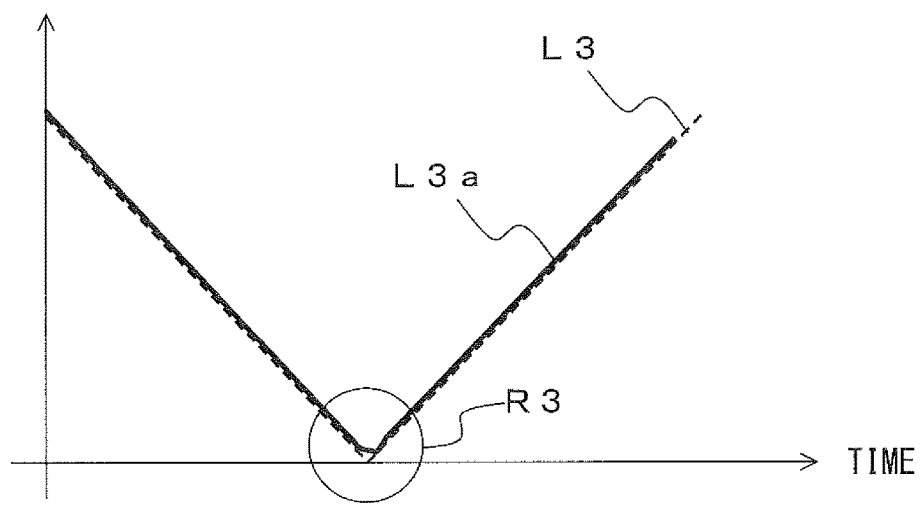
FIG. 9 shows a response character of a scanner in a reciprocal scan related to the Y directions.

FIG. 6 shows a drive signal waveform in a one-way scan related to the Y directions. FIG. 7 shows a response character of a scanner in a one-way scan related to the Y direction. FIG. 8 shows a drive signal waveform in a reciprocal scan related to the Y directions. FIG. 9 shows a response character of a scanner in a reciprocal scan related to the Y directions. FIG. 10 shows comparisons of ratios of validity periods and invalidity periods for each scan setting.

Hereinafter, by referring to FIG. 6 through FIG. 10, detailed explanations will be given for the scanning microscope 100 in which a reciprocal scan in the Y directions is performed, in comparison to a conventional scanning microscope in which a one-way scan is performed. Note that in the scanning microscope 100, the scanner 4a that performs a scan in an X direction performs a one-way scan in which sample S is scanned in one of the forward movement and the backward movement.

In a conventional scanning microscope, which performs an one-way scan in a Y direction, it is desirable for one of the forward movement period and the backward movement period, which is a period of time until the scan position returns to the scan starting position after performing an one-way scan (which will be referred to as a flyback period hereinafter), to be as short as possible. Thus, the scan drive control circuit operates the scanner at different speeds between the forward movement and the backward movement. In more detail, the scan drive control circuit controls the two-dimensional scan mechanism so that the operation speed of the scanner in the flyback period is higher than the operation speed of the scanner in the one-way scan period including an image validity period. Accordingly, in a conventional scanning microscope, drive signal waveform L1 related to a Y direction is a sawtooth wave as shown in FIG. 6.

Note that in the present document, the drive signal waveform related to the Y directions is a waveform representing a scan target position at each time related to the Y directions, and is distinguished from a drive waveform representing the actual scan position at each time related to the Y directions.

Drive signal waveform L1, which is a sawtooth wave, contains a very high frequency component at the returning point of the scanner. Thus, when the scanner is controlled in accordance with drive signal waveform L1, the feedback control temporarily fails to follow at the returning point, delaying a response of the scanner so that the scan position is shifted from the scan target position. Accordingly, as shown in FIG. 7, drive waveform L1$a$ of the scanner represents a waveform that is diverted from drive signal waveform L1 at returning point R1. Note that drive waveform L1$a$ of the scanner is diverted from drive signal waveform L1 also at returning point R2.

Generating image data by using a digital signal obtained during a period with drive waveform L1$a$ diverted from drive signal waveform L1 results in a distorted image. Thus, in a conventional scanning microscope, not the entire scan scope in the Y directions is converted into images. In order to keep image distortion due to response delays of the scanner at an allowable level, the scope of just about 80% through 90% of the angle of field is converted into images. Note that solid line L2 appearing in FIG. 6 represents an image validity period, which is a period corresponding to a scan scope in which conversion into images is performed (image validity scope).

Also, in a state in which the feedback control fails to follow so that the scanner delays (for example returning point R1), a very large amount of electricity flows instantaneously to the scanner in order to recover the control, applying a great force so as to physically move the scanner sharply. This not only distorts images but also causes vibrations in the device. Such vibrations may sometimes affect the image quality or the accuracy of measurement data.

By contrast, in the scanning microscope 100 that performs a reciprocal scan in the Y directions, the scan drive control circuit 14 controls the two-dimensional scanning mechanism 4 so that the scanner 4$b$ operates at the same speed in both the forward movement and the backward movement. Thus, in the scanning microscope 100, drive signal waveform L3 related to the Y directions is a triangle wave as shown in FIG. 8. Also, solid lines L4 and L5, which are drawn on drive signal waveform L3 drawn by a dashed line, represent an image validity period during the forward movement period and an image validity period during the backward movement period, respectively.

Drive signal waveform L3, which is a triangle wave contains a low frequency component at the returning point of the scanner, compared to drive signal waveform L1, which is a sawtooth wave. Accordingly, when the scanner is controlled in accordance with a drive signal waveform, a response of the scanner does not delay greatly even at returning point R3. As shown in FIG. 9, drive waveform L1$a$ of the scanner is not diverted from drive signal waveform L3 at returning point R3, and the scan position changes approximately to the scan target position.

Accordingly, in the scanning microscope 100, the scan drive control circuit 14 controls the two-dimensional scanning mechanism 4 in such a manner that the drive signal waveform of the scanner 4$b$ becomes a triangle wave and thereby it is possible to reduce distortion of images compared to conventional scanning microscopes while obtaining images both in the forward movement and the backward movement. Thus, according to the scanning microscope 100, it is possible to obtain an image more effectively without deteriorating the image quality and reduce the image obtainment time compared to conventional scanning microscopes. It is also possible to suppress the generation of a large flow of electricity at returning points. Thereby, it is also possible to realize power saving and reduction in vibrations.

Also, in the scanning microscope 100, because distortion of images is smaller, the ratio of the image validity period to the forward movement period (or the backward movement period) can be made greater than that for conventional scanning microscopes. This leads to increase in the ratio of a validity period (image validity period) to an invalidity period, and thus can contribute to further reduction of the image obtainment time. Further, in the scanning microscope 100, because distortion of images is smaller, the operation speed of the scanner can be increased. For example, a scanner that has been used at an operation frequency of 20 Hz in a conventional scanning microscope may be used at an operation frequency of 30 Hz. Increase in the operation speed of the scanner as well can contribute to a further reduction in the image obtainment time. Note that these are effective particularly when a sparse scan is performed.

A sparse scan is a technique for reducing an image obtainment time by partially thinning scans (line scans) in the X directions. Data of pixels in areas thinned by the sparse scan is calculated by interpolating the surrounding pixel data.

Figure 10A:
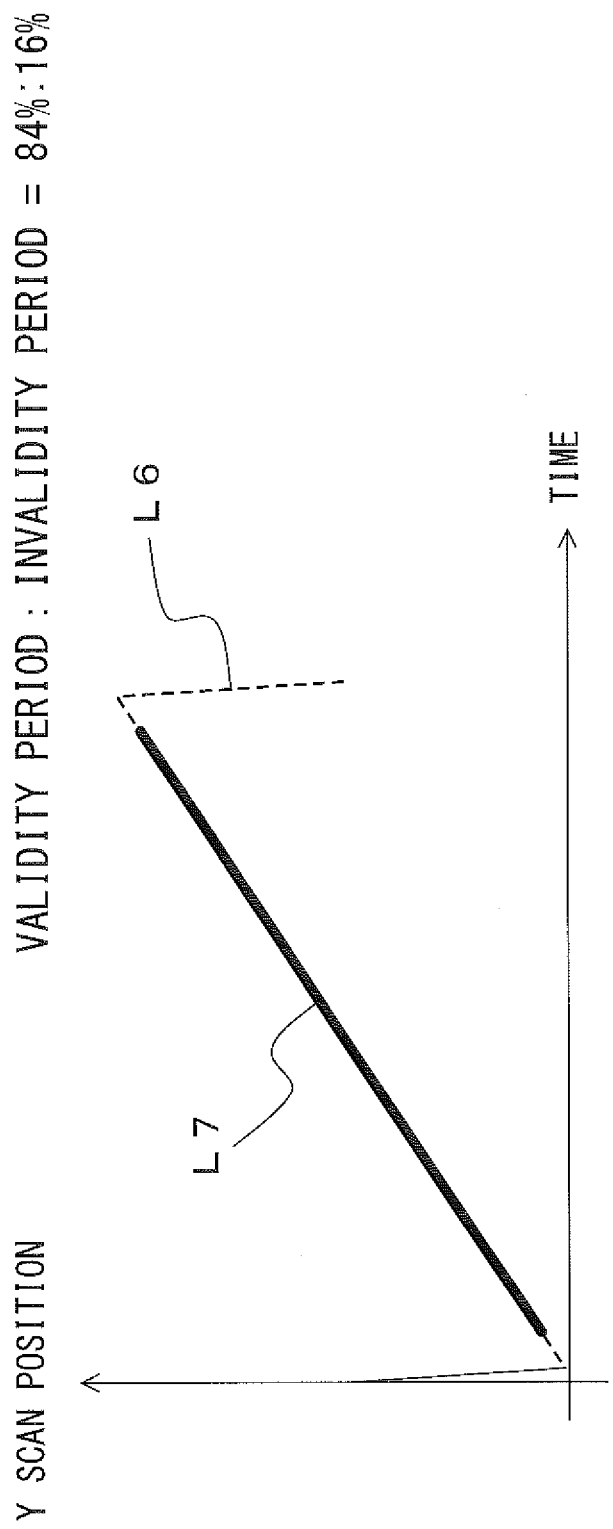
FIG. 10A through FIG. 10C compare ratios of validity periods and invalidity periods for each scan setting.

In a conventional scanning microscope, when a sparse scan is not performed, the ratio of the flyback period to the one-way scan period is relatively small. Therefore, even when an one-way scan is to be performed in the Y directions, the ratio of the validity period to the entire period including the validity and invalidity periods is generally high, and is for example 80% or higher as shown in FIG. 10A. Note in FIG. 10A that dashed line L6 is a drive signal waveform and solid line L7 represents an image validity period.

Figure 10B:
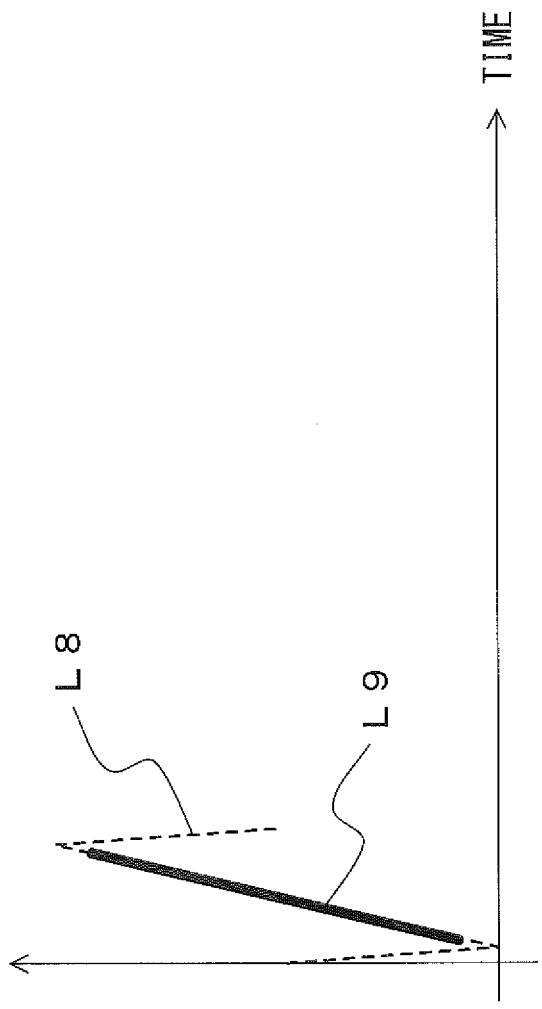

However, when a conventional scanning microscope performs a sparse scan, the operation speed of the scanner increases, resulting in a shorter one-way scan period and relatively increasing the ratio of the flyback period to the one-way scan period. Accordingly, when for example a sparse scan in which a line scan is performed for every 8 lines (1/8 scan) is performed, the ratio of the validity period to the entire period is reduced to a ratio a little less than 60% as shown in FIG. 10B. This means that the time reduction effect caused by sparse scans is not sufficiently reflected on the reduction in the image obtainment time. Note in FIG. 10B that dashed line L8 is a drive signal waveform and solid line L9 represents an image validity period.

By contrast, in the scanning microscope 100 that performs a reciprocal scan in the Y directions, even when for example a sparse scan in which a line scan is performed for every 8 lines (1/8 scan), the ratio of the validity period to the entire period is kept high. In the example shown in FIG. 10C, even when a sparse scan is performed, the ratio of the validity period is higher than in a case of a conventional scanning microscope not performing a sparse scan, and reaches to a ration a little less than 90%. Note in FIG. 10C that dashed line L10 is a drive signal waveform and solid line L11 represents an image validity period.

Figure 10C:
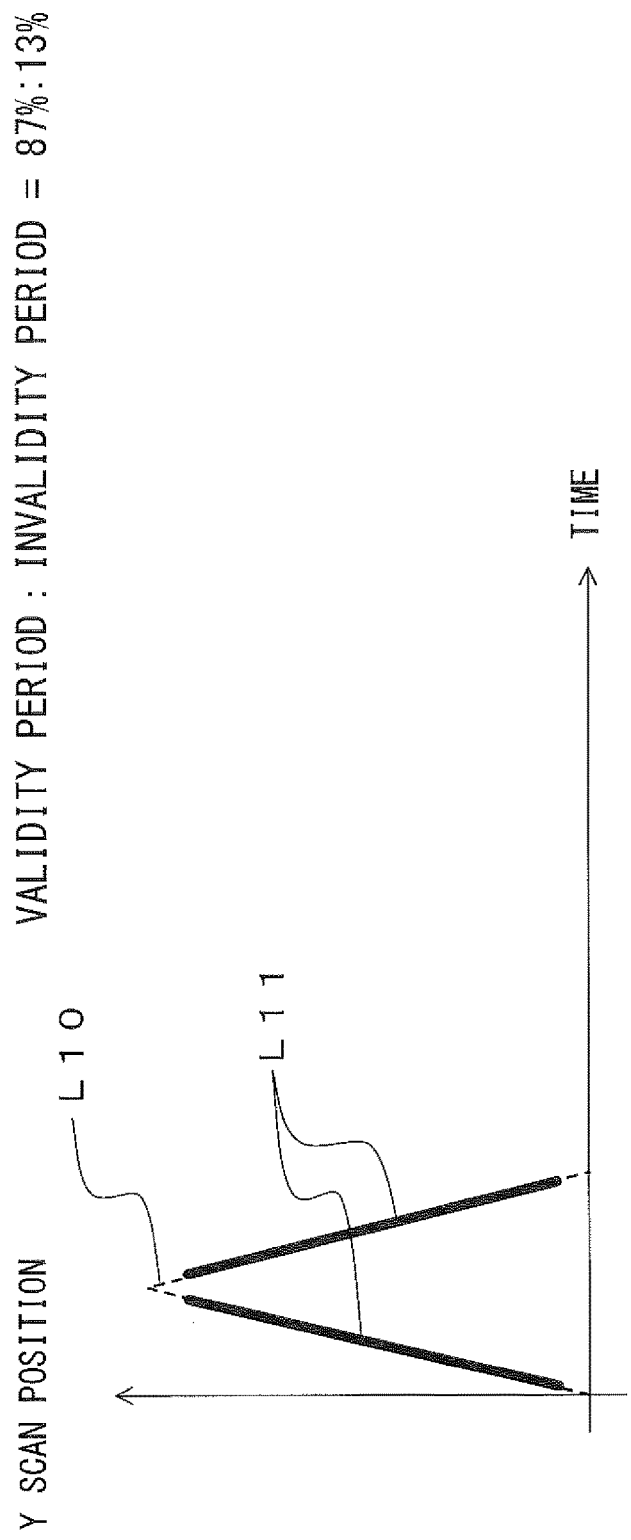

As shown in FIG. 10A through 10C, in the scanning microscope 100, when a sparse scan is performed, i.e., when the operation speed of the scanner 4b is high, the ratio of the validity period can be kept high. This makes it possible to sufficiently reflect the increase in the operation speed of the scanner 4b attained by a sparse scan to the reduction in an image obtainment time.

Figure 11:
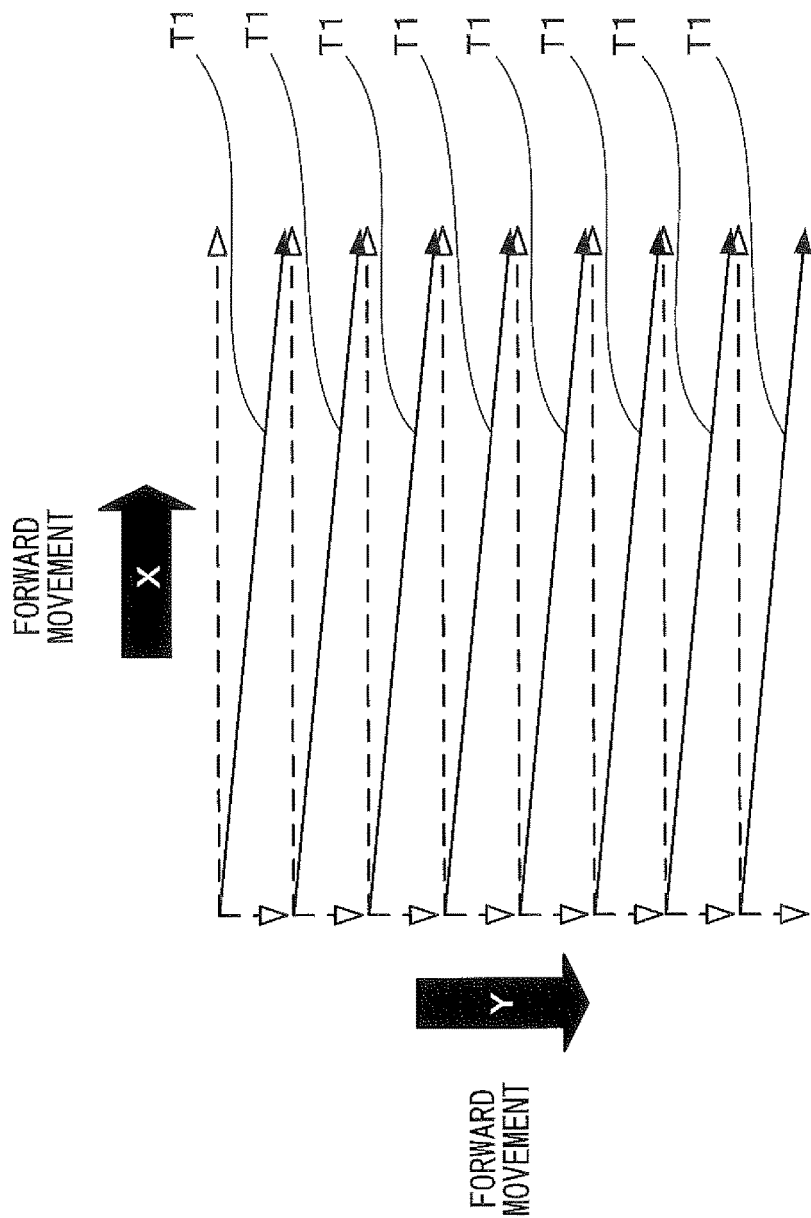
FIG. 11 shows a sampling trajectory in the forward movement in a reciprocal scan in the Y directions.
Figure 12:
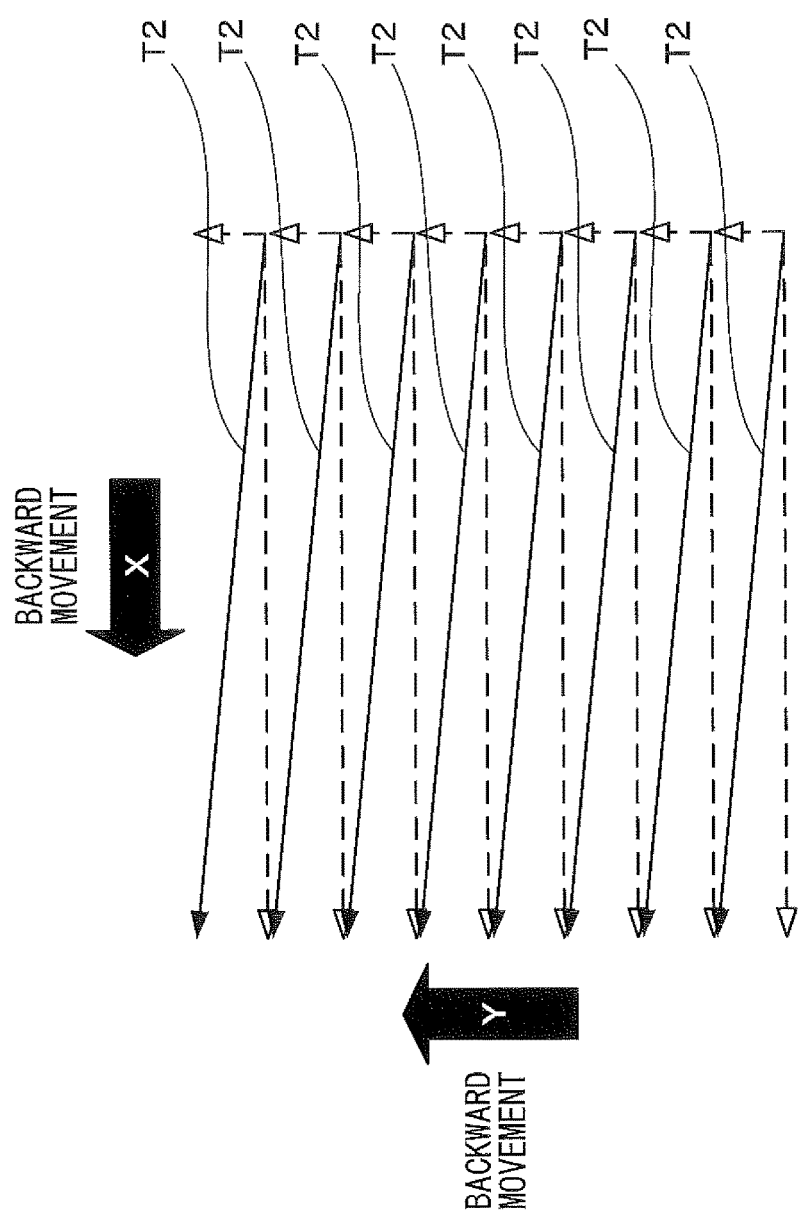
FIG. 12 shows a sampling trajectory in the backward movement in a reciprocal scan in the Y directions.

FIG. 11 shows a sampling trajectory in the forward movement in a reciprocal scan in the Y directions. FIG. 12 shows a sampling trajectory in the backward movement in a reciprocal scan in the Y directions. Hereinafter, explanations will be given, while referring to FIG. 11 and FIG. 12, for a method of suppressing a shift between two images that are obtained by a reciprocal scan performed by the scanner 4b in the scanning microscope 100.

Because the scanning cycle in which a line scan is performed is short, even when the scanner 4b is driven in a stepping manner, the scanner 4b does not stop completely at each stopping positions. Accordingly, in a raster scan, the scan position moves substantially in both the X directions and the Y directions and the sampling positions as well moves substantially in both the X directions and the Y directions. In such a case, setting the one-way scan period of the scanner 4a to the forward movement period (or the backward movement period) in both the forward movement period and the backward movement period of the scanner 4b results in different sampling trajectories between the forward movement period and the backward movement period of the scanner 4b. This causes a shift of a sampling position between an image obtained in the forward movement period and an image obtained in the backward movement period.

Accordingly, in the scanning microscope 100, the scan drive control circuit 14 controls the two-dimensional scanning mechanism 4 so that the scan trajectory during the forward movement period of the scanner 4b and the scan trajectory during the backward movement period of the scanner 4b correspond. In this example, the fact that scan trajectories correspond means that the scan trajectories represent substantially the same trajectory. It is desirable that the starting position of the scan trajectory during the forward movement period of the scanner 4b coincides with the ending point of the scan trajectory during the backward movement period and that the ending point of the scan trajectory during the forward movement period of the scanner 4b coincides with the starting point of the scan trajectory during the backward movement period.

Further, in the scanning microscope 100, the A/D converter 16 samples an analog signal from the photodetector 13 so that the sampling trajectory during the forward movement period of the scanner 4b and the sampling trajectory during the backward movement period of the scanner 4b correspond. Specifically, the A/D converter 16 samples a signal from the photodetector 13 during the forward movement period of both the scanner 4b and the scanner 4a as shown in FIG. 11 and samples a signal from the photodetector 13 during the backward movement period of both the scanner 4b and the scanner 4a as shown in FIG. 12. In other words, the direction of the one-way scan of the scanner 4a is switched between the forward movement and the backward movement of the scanner 4b.

Thereby, sampling trajectory T1 during the forward movement period of the scanner 4b and sampling trajectory T2 during the backward movement period of the scanner 4b correspond. This results in suppression of a shift between the sampling position at which sampling is performed during the forward movement period of the scanner 4b and the sampling position at which sampling is performed during backward movement period of the scanner 4b. This makes it possible to suppress a shift between two images obtained in a reciprocal scan.

Note that the combinations between the forward movement period and the backward movement period of the scanner 4a and the scanner 4b are not limited to the examples shown in FIG. 11 and FIG. 12. It is sufficient if the A/D converter 16 samples an analog signal from the photodetector 13 so that the sampling trajectory during the forward movement period of the scanner 4b and the sampling trajectory during the backward movement period of the scanner 4b correspond. Accordingly, it is sufficient for the A/D converter 16 to sample a signal from the photodetector 13 in one of the forward movement period and the backward movement period of the scanner 4a during the forward movement period of the scanner 4b and to sample a signal from the photodetector 13 in the other of the forward movement period and the backward movement period of the scanner 4a during the backward movement period of the scanner 4b.

The computer 20 determines whether a digital signal output from the A/D converter 16 is a digital signal output during the forward movement period of the scanner 4b or a digital signal output during the backward movement period of the scanner 4b. Then, the computer 20 assembles image data by rearranging pieces of pixel data in accordance with the periods in which the signals were output. This makes it possible to unify the orientation of two images for an erected image or an inverted image, the two images being obtained in a reciprocal scan of the scanner 4b. A method of determining whether a digital signal was output during a forward movement period or a backward movement period is not limited particularly. For example, it is possible to determine it in accordance with a status signal output from the scan drive control circuit 14 or to determine it in accordance with the ordinal number of the piece of image data that is being generated.

According to the scanning microscope 100, it is possible to suppress a shift between images that are obtained in a reciprocal scan. Accordingly, it is possible to obtain highly accurate three-dimensional information (omnifocal image data, height information) in a short period of time.

[Second Embodiment]

A scanning microscope according to the present embodiment is different from the scanning microscope 100 in that it employs a resonant scanner as the scanner 4a. Also, the scanning microscope according to the present embodiment is different from the scanning microscope 100 also in that not only the scanner 4b but also scanner 4a performs a reciprocal scan (i.e., that the A/D converter 16 samples a signal from the photodetector 13 in both the forward movement period and the backward movement period of the scanner 4a). Also, the scanning microscope according to the present embodiment is different from the scanning microscope 100 also in that it includes a clock generation circuit 50 instead of the clock generation circuit 15. The other constituents are similar to those of the scanning microscope 100.

Generally, resonant scanners can perform a scan at a speed higher than a speed of a galvano scanner, and are advantageous for the reduction in an image obtainment time. However, their operation speed is not constant during the period of the cyclic motion, and the speed variation is represented by a sine function. In other words, they scan sample S at an inconstant speed. This prevents the sampling positions from being arranged at spatially equal intervals when sampling is performed at temporally equal intervals, resulting in distorted images.

Accordingly, in the scanning microscope according to the present embodiment, the clock generation circuit 50 generates a sampling clock so as to output it to the A/D converter 16 so that the sampling positions on the sample S move with equal intervals. In other words, a sampling clock generated by the clock generation circuit 50 is a sampling clock synchronized with the operation speed of the scanner 4a, and the clock intervals become shorter with increasing operation speeds and becomes longer with decreasing operation speeds.

Specifically, the clock generation circuit 50 generates a sampling clock synchronized with the operation speed, on the basis of for example a scan timing signal received from the scan drive control circuit 14 and the speed waveform information of the scanner 4a. Note that speed waveform information is information representing how the movement speed of the optical spot should change, the optical spot being formed on the sample S during a period during which the scanner 4a is scanning sample S. More specifically, speed waveform information is information of a movement speed that is a target of an optical spot at each timing in one scanning cycle. A sampling position at each timing can be determined on the basis of a scan timing signal and speed waveform information.

Figure 13:
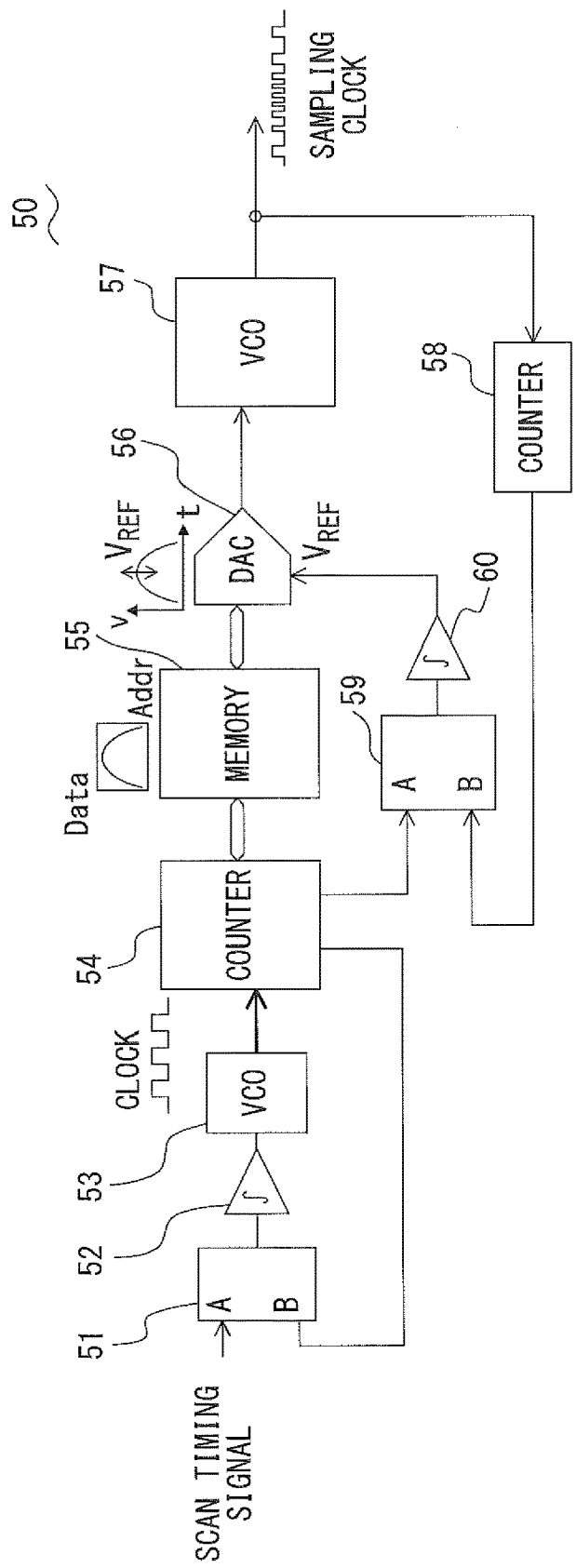
FIG. 13 is a block diagram showing an example of a configuration of a clock generation circuit 50 according to the second embodiment.
Figure 14:
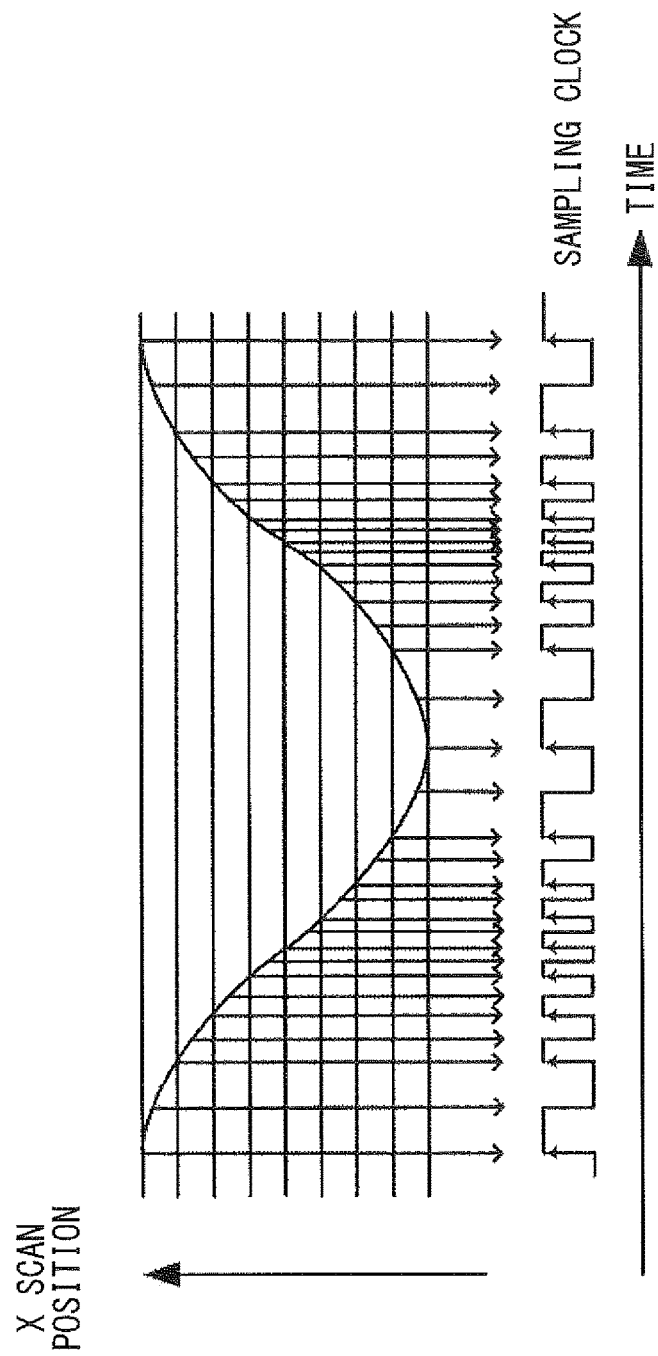
FIG. 14 shows a relationship between sampling clocks output from the clock generation circuit 50 and scan positions.

FIG. 13 is a block diagram showing an example of a configuration of the clock generation circuit 50 according to the present embodiment. FIG. 14 shows a relationship between sampling clocks output from the clock generation circuit 50 and the scan positions in the X directions. By referring to FIG. 13 and FIG. 14, explanations will be given for the clock generation circuit 50 that generates a sampling clock synchronized with the operation speed of the scanner 4a. Note that the configuration shown in FIG. 13 is an example of a configuration of the clock generation circuit 50 and a configuration of the clock generation circuit 50 is not limited to the configuration shown in FIG. 13.

The clock generation circuit 50 includes a phase comparator 51, a loop filter 52, a voltage controlled oscillator (which will be referred to as a VCO hereinafter) 53, a counter 54, a memory 55, a D/A converter 56, a VCO 57, a counter 58, a phase comparator 59 and a loop filter 60.

A scan timing signal output from the scan drive control circuit 14 and a timing signal output from the counter 54 (which will be referred to as a first timing signal hereinafter) are input to the phase comparator 51. A first timing signal will be described later. The phase comparator 51 detects a phase difference between the two input signals (the scan timing signal and the first timing signal) so as to output a signal in accordance with the phase difference. For example, the phase comparator 51 outputs a signal having a voltage that is in a relationship in which the earlier the first timing is than the scan timing signal, the lower the voltage is and the later the first timing signal is than the scan timing signal, the higher the voltage is. A signal output from the phase comparator 51 is input to the VCO 53 via the loop filter 52 that is a low-pass filter. The VCO 53 is a variable frequency oscillator, and generates a clock of a frequency in accordance with an input signal (voltage). For example, the VCO 53 generates a clock of a frequency that is in a relationship in which the higher the input voltage is, the higher the frequency is and the lower the input voltage is, the lower the frequency is. The counter 54 counts the clocks from the VCO 53, and outputs a first timing signal to the phase comparator 51 each time the counted number reaches prescribed number of times C1 (1000 times for example). Note that the counter 54 outputs the first timing signal also to the phase comparator 59, which will be described later.

Through the loop constituted between the phase comparator 51 and the counter 54, scan timing signals and first timing signals converge in the same cycle and to the same phase. Because of this, in a convergent state, as many clocks as the number of times C1 are output from the VCO 53 at constant temporal intervals in one scanning cycle. In other words, clocks of a constant frequency are output from the VCO 53.

The memory 55 holds at least as many addresses (from 0 Through 999) as the number of times C1 set in the counter 54. Each address stores speed information for reproducing the speed waveform (sine waveform) of the scanner 4a. For example, the N-th address stores the speed information of the scanner 4a at the timing of the (N−1)/C1 cycles. The D/A converter 56 reads the speed information from the address in accordance with the counter value in the memory 55 so as to convert the information into an analog signal each time the counter 54 performs counting. Thereby, the voltage that reproduced the speed waveform (sine waveform) of the scanner 4a is output to the VCO 57. Similarly to the VCO 53, The VCO 57 is a variable frequency oscillator, and generates a clock of a frequency in accordance with an input signal (voltage). Because of this, the VCO 57 outputs clocks at a high frequency when the speed of the scanner 4a is high and the input voltage is high, and outputs clocks at a low frequency when the speed is low and the input voltage is low. Note that clocks output from the VCO 57 are output to the A/D converter 16 as sampling clocks.

The counter 58 counts the clocks from the VCO 57, and outputs a second timing signal to the phase comparator 59 each time the counted number reaches prescribed number of times C2 (2048 times for example). The phase comparator 59 detects a phase difference between the first and second timing signals so as to output a signal in accordance with the phase difference, the first and second timing signals being output from the counter 54 and the counter 58 respectively. For example, the phase comparator 59 outputs a signal having a voltage that is in a relationship in which the earlier the second timing is than the first timing signal, the lower the voltage is and the later the second timing signal is than the first timing signal, the higher the voltage is. A signal output from the phase comparator 59 is input to the D/A converter 56 via the loop filter 60 that is a low-pass filter. The D/A converter 56 adjusts the magnitude of an analog signal in accordance with a signal from the phase comparator 59 so as to output the signal.

The first and second timing signals converge in the same cycle through the loop constituted between the counter 54 and the loop filter 60, and thus scan timing signals and second timing signals as well converge in the same cycle. Also, because an electric delay occurs as a phase shift between a timing signal and the actual scanner 4a, the phases are adjusted. Thereby, in the convergent state and in the phase-adjusted state, as many sampling clocks as the number of times C2 are output from VCO 57 in one scanning cycle at timings at which the scan position moves at equal intervals. In other words, from the VCO 57, sampling clocks synchronized with the operation speed of the scanner 4a are output as shown in FIG. 14.

In the scanning microscope according to the present embodiment, the A/D converter 16 performs sampling in accordance with sampling clocks output from the clock generation circuit 50. This makes it possible to move the sampling position at spatially equal intervals by using the scanner 4a that is a resonant scanner faster than a galvano scanner. Further, the A/D converter 16 samples a signal from the photodetector 13 in both the forward movement period and the backward movement period of the scanner 4a. Accordingly, the scanning microscope of the present embodiment makes it possible to obtain an image more effectively than the scanning microscope 100 without deteriorating the image quality. As a result of this, it is possible to further reduce the image obtainment time.

Figure 15:
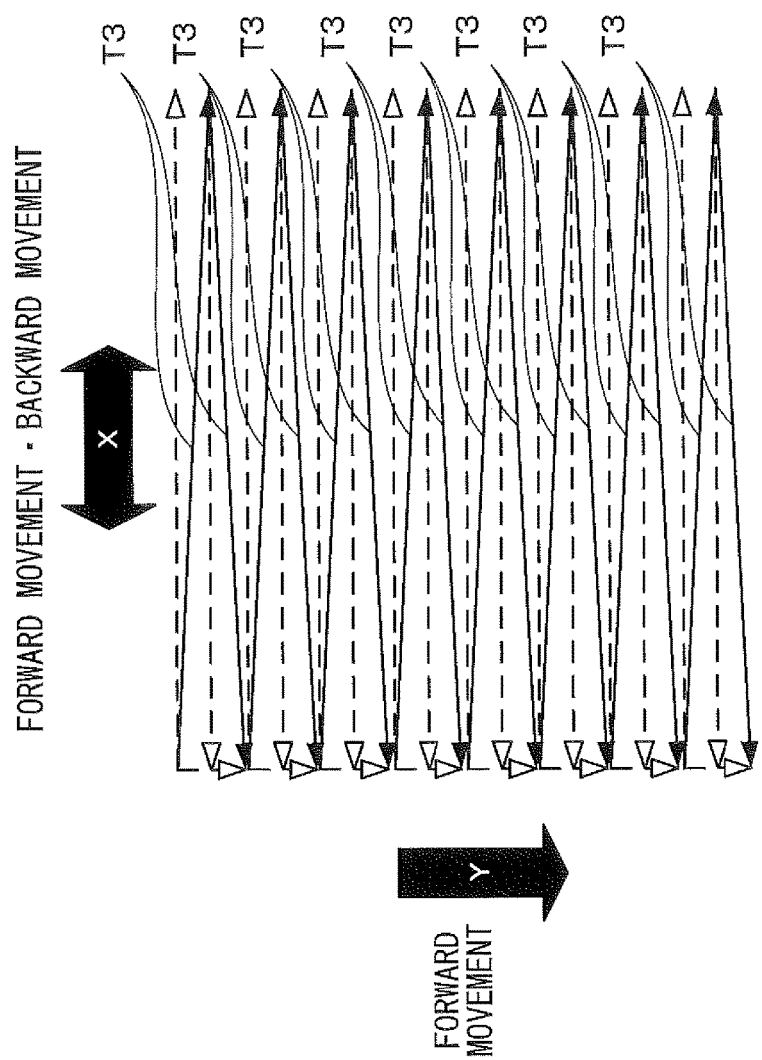
FIG. 15 shows sampling trajectories in the forward movement in a reciprocal scan in the Y directions.
Figure 16:
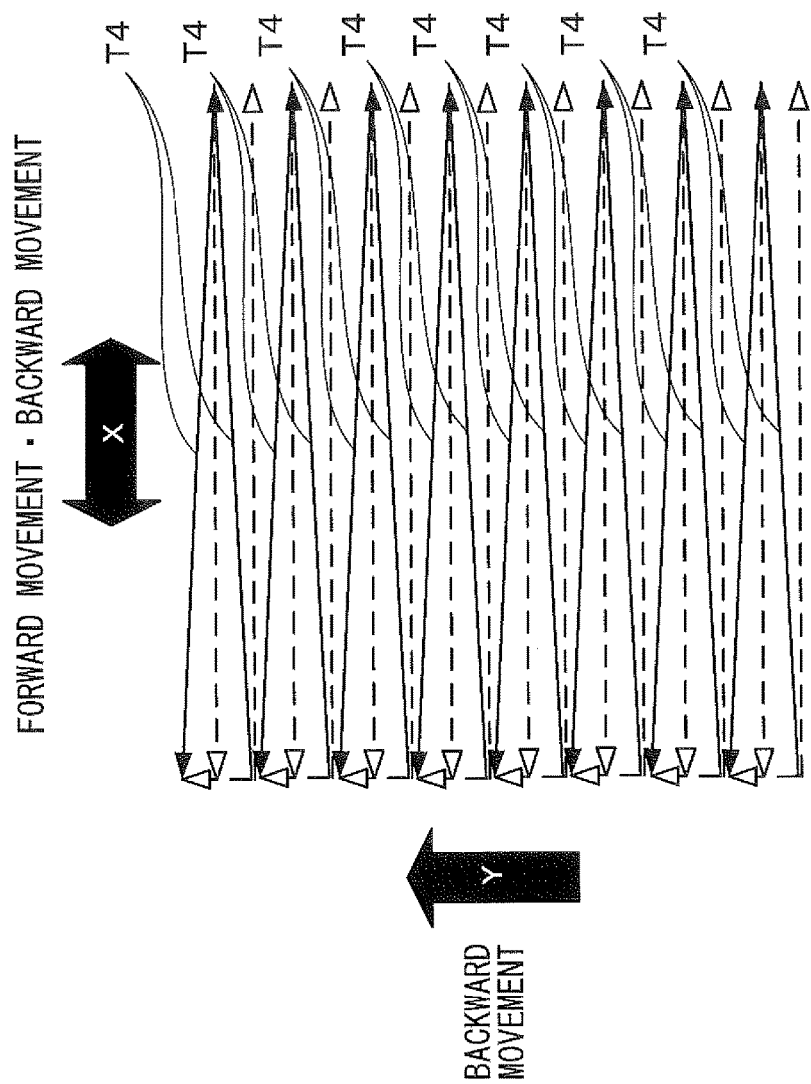
FIG. 16 shows sampling trajectories in the backward movement in a reciprocal scan in the Y directions.

FIG. 15 shows sampling trajectories in the forward movement in a reciprocal scan in the Y directions. FIG. 16 shows sampling trajectories in the backward movement in a reciprocal scan in the Y directions. Hereinafter, explanations will be given, while referring to FIG. 15 and FIG. 16, for a method of suppressing a shift between two images that are obtained by a reciprocal scan performed by the scanner 4b in the scanning microscope according to the present embodiment.

In the scanning microscope according to the present embodiment, the scan drive control circuit 14 controls the two-dimensional scanning mechanism 4 so that the scan trajectory during the forward movement period of the scanner 4b and the scan trajectory during the backward movement period of the scanner 4b correspond. Specifically, the scan drive control circuit 14 controls the two-dimensional scanning mechanism 4 so that the position scanned during a period corresponding to the forward movement period of the scanner 4b and the forward movement period of the scanner 4a is scanned during a period corresponding to the backward movement period of the scanner 4b and the backward movement period of the scanner 4a. Further, the scan drive control circuit 14 controls the two-dimensional scanning mechanism 4 so that the position scanned during a period corresponding to the forward movement period of the scanner 4b and the backward movement period of the scanner 4a is scanned during a period corresponding to the backward movement period of the scanner 4b and the forward movement period of the scanner 4a. In other words, when the forward movement period of the scanner 4b starts from the forward movement period of the scanner 4a, it is sufficient for the scan drive control circuit 14 to control the two-dimensional scanning mechanism 4 so that the backward movement period of the scanner 4b ends in the backward movement period of the scanner 4a. Also, when the forward movement period of the scanner 4b starts from the backward movement period of the scanner 4a, it is sufficient to control the two-dimensional scanning mechanism 4 so that the backward movement period of the scanner 4b ends in the forward movement period of the scanner 4a.

Figure 17:
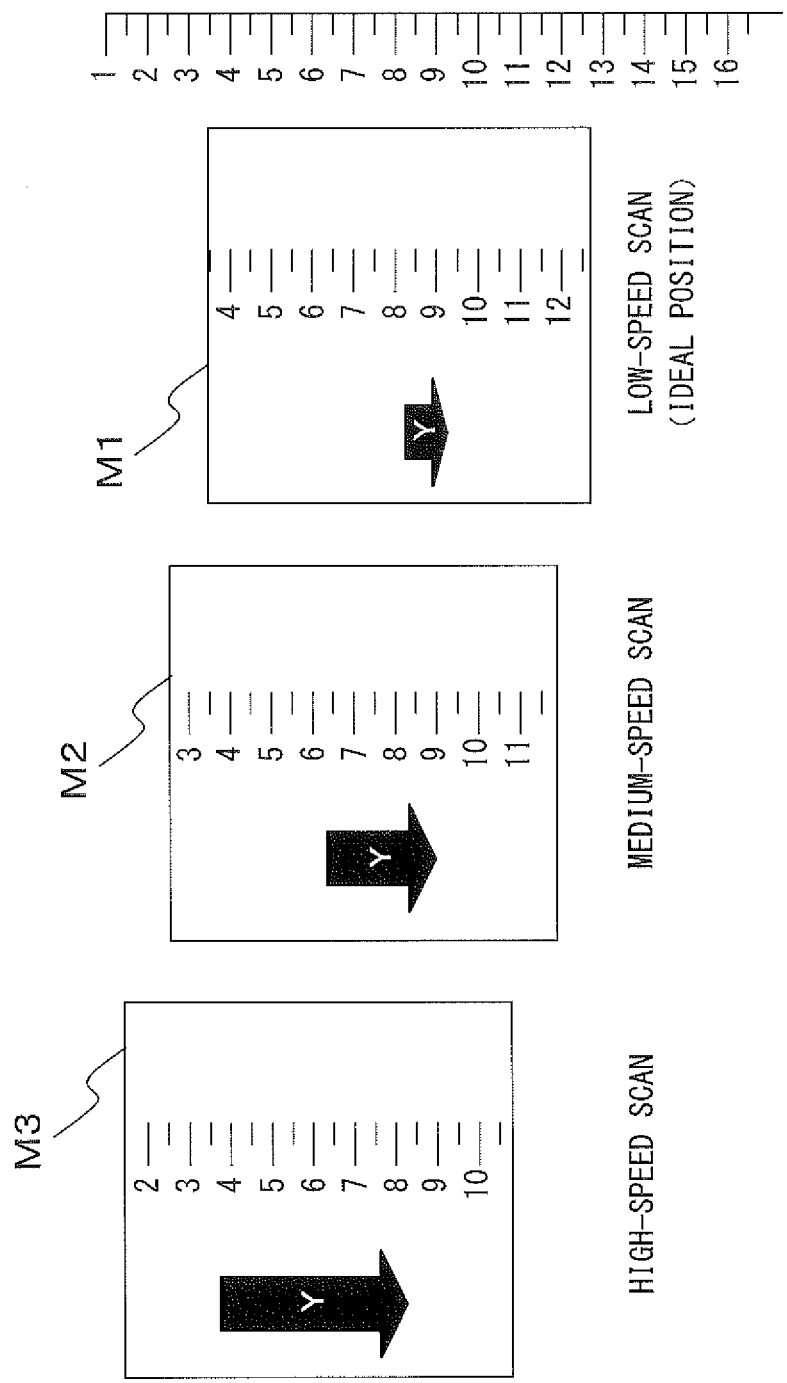
FIG. 17 is a chart that shows relationships between response delays of a scanner that performs scans in the Y directions and image validity scopes.

In the scanning microscope according to the present embodiment, a scan trajectory and a sampling trajectory are substantially the same. Accordingly, making the scan trajectories correspond between the forward movement period and backward movement period of the scanner 4b also makes sampling trajectory T3 during the forward movement period of the scanner 4b and sampling trajectory T4 during the backward movement period of the scanner 4b correspond as shown in FIG. 16 and FIG. 17. As a result of this, a shift is suppressed between a sampling position at which sampling was performed during the forward movement period of the scanner 4b and a sampling position at which sampling was performed during the backward movement period of the scanner 4b. This makes it possible to suppress a shift between two images that are obtained by a reciprocal scan.

The computer 20 determines whether a digital signal output from the A/D converter 16 is a digital signal output during the forward movement period of the scanner 4b or a digital signal output during the backward movement period of the scanner 4b. The computer 20 further determines whether or not the signal is a digital signal output during the forward movement period of the scanner 4a or a digital signal output during the backward movement period of the scanner 4a. Then, the computer 20 assembles image data by rearranging pieces of pixel data in accordance with the periods in which the signals were output. This makes it possible to unify the orientation of two images for an erected image or an inverted image, the two images being obtained in a reciprocal scan of the scanner 4b.

Accordingly, the scanning microscope according to the present embodiment as well can suppress a shift between images obtained by a reciprocal scan. Accordingly, it is possible to obtain highly accurate three-dimensional information (omnifocal image data, height information) in a shorter period of time than a period of time that it takes the scanning microscope 100.

[Third Embodiment]

In conventional scanning microscopes, output timings for image validity signals in the Y directions (which will be referred to as Y image validity signals hereinafter) are consistent with respect to drive signal waveforms of a scanner that performs a scan in the Y directions (which will be referred to as Y drive signal waveforms hereinafter). However, when Y image validity signals are output at consistent timings with respect to Y drive signal waveforms, a response delay of the scanner changes a scan scope (image validity scope) that is converted into an image.

Figure 18:
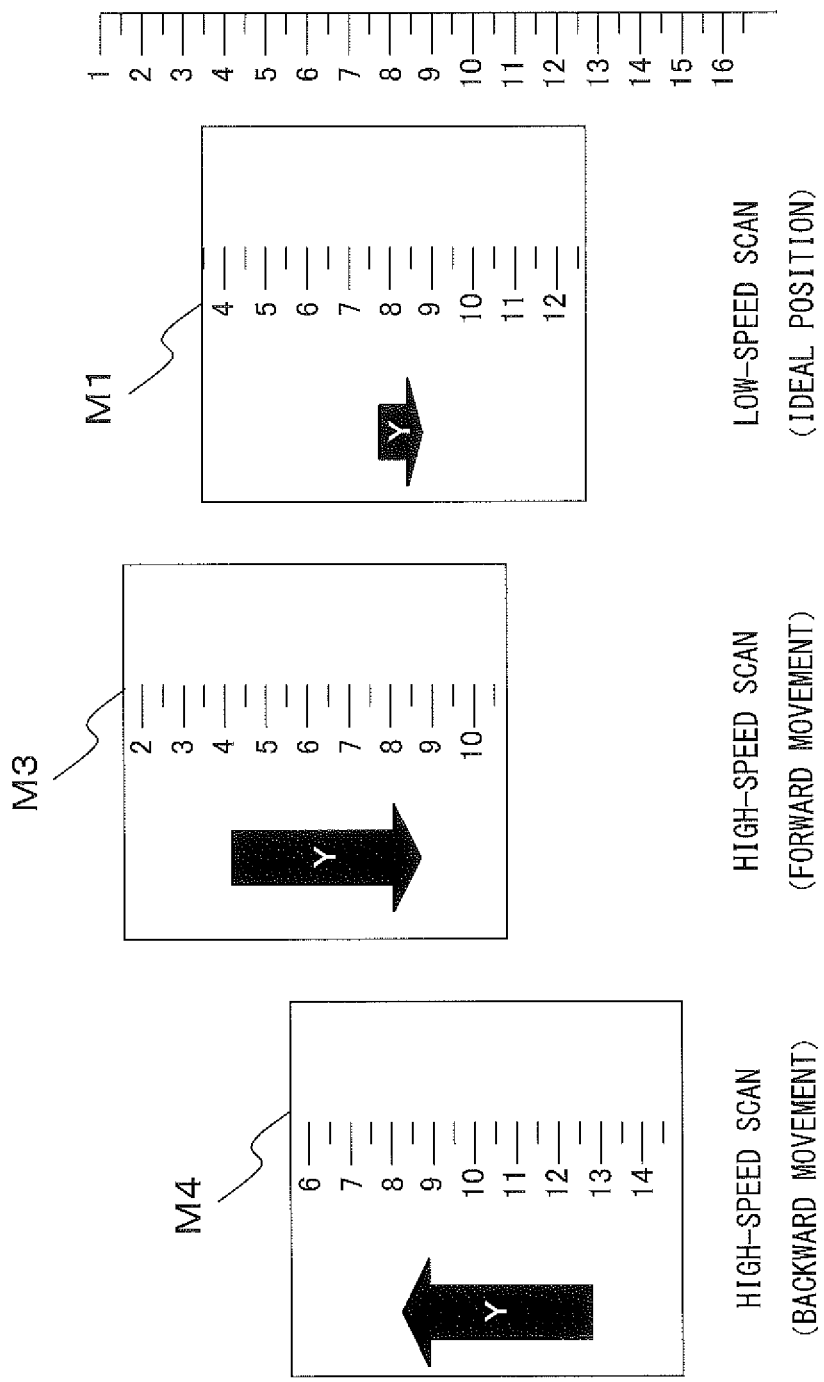
FIG. 18 is another chart that shows relationships between response delays of a scanner that performs scans in the Y directions and image validity scopes.

FIG. 17 and FIG. 18 show relationships between response delays of a scanner that performs scans in the Y directions and image validity scopes. As shown in FIG. 17, the higher the speed of the scanner is, the more the image validity scopes of images (images M1, M2 and M3) obtained at different scan speeds are shifted from the ideal positions as a general rule. Also, as represented by images M3 and M4 in FIG. 18, the shifts between the image validity scopes and the ideal positions are made in the opposite directions between the forward and backward movements. This causes a shift in the image validity scopes between images when a reciprocal scan is performed.

The scanning microscope according to the present embodiment is different from the scanning microscope 100 in that the scan drive control circuit 14 is configured to adjust an output timing for a Y image validity signal of the scanner 4b with respect to a Y drive signal waveform of the scanner 4b. In more detail, the scan drive control circuit 14 adjusts an output timing for a Y image validity signal of the scanner 4b with respect to a drive signal waveform of the scanner 4b so that an image validity scope that is converted into an image during a forward movement period of the scanner 4b and an image validity scope that is converted into an image during backward movement period of the scanner 4b match.

Accordingly, the scanning microscope of the present embodiment makes it possible to convert a desired scope into an image regardless of the presence or absence of a response delay of the scanner 4b. This makes it possible to pick up the same area of a sample even in a case for example when preliminary pickup and main pickup are operated at different speeds, the preliminary pickup scanning the sample in a rough manner before the main pickup and the main pickup scanning the sample more densely than in the preliminary pickup. It is also possible to suppress deterioration in the image quality caused by a reciprocal scan.

Figure 19:
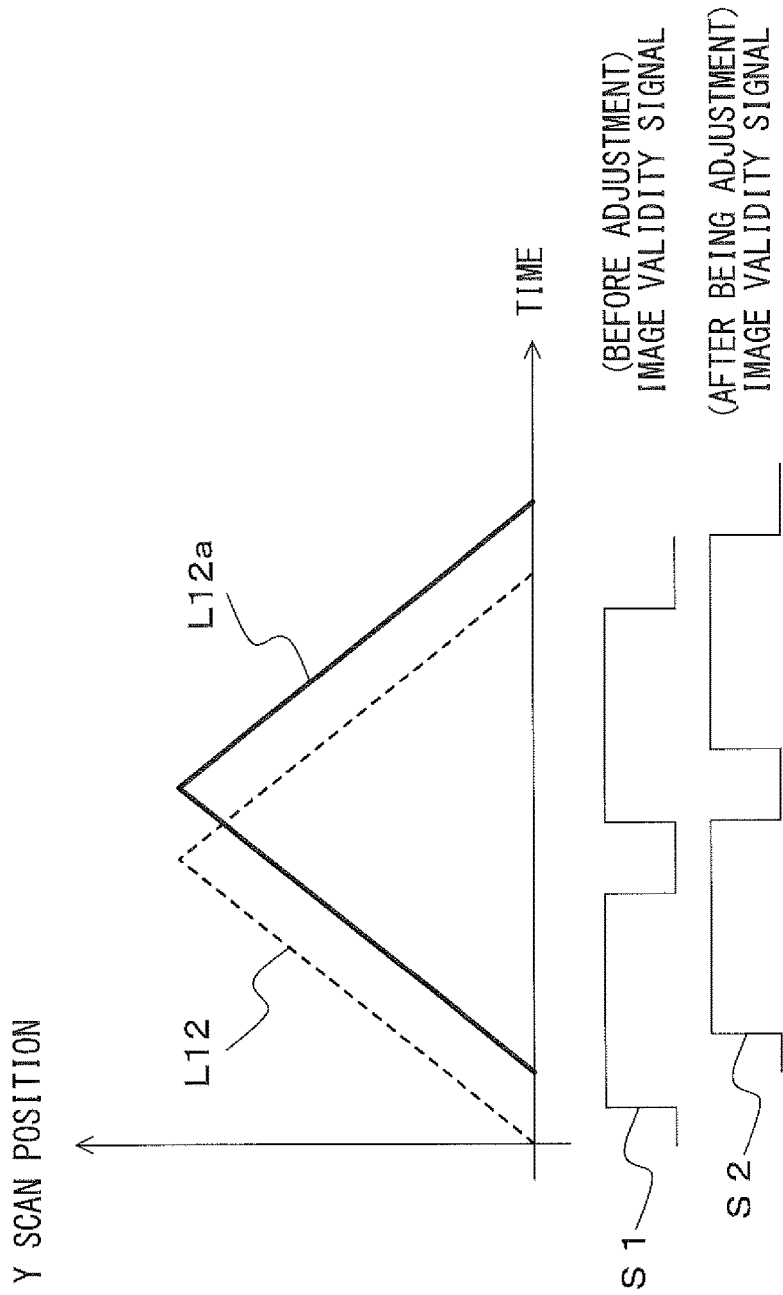
FIG. 19 is a graph that explains a method of suppressing variations in image validity scopes caused by a response delay of a scanner that performs a scan in the Y directions.
Figure 20:
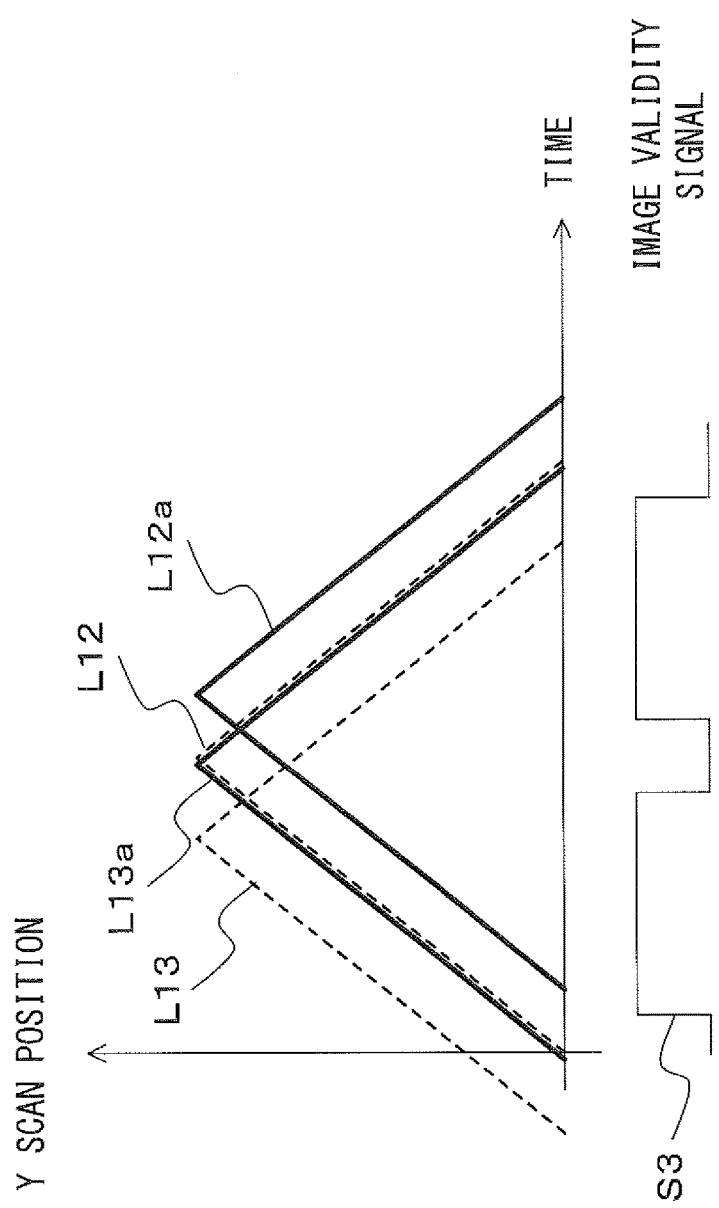
FIG. 20 is graph that explains another method of suppressing variations in image validity scopes caused by a response delay of a scanner that performs a scan in the Y directions.

FIG. 19 and FIG. 20 explain a method of suppressing variations in image validity scopes caused by a response delay of a scanner that performs a scan in the Y directions. Specific methods of the above adjustments are not limited particularly. For example, as shown in FIG. 19, the adjustments can be performed by temporally delaying an output timing for an image validity signal. Thereby, an output timing for an image validity signal may be adjusted to a timing based on Y drive waveform L12a, which represents the actual scan position (see image validity signal S2), from a timing based on Y drive signal waveform L12 (see image validity signal S1). Also, as shown in FIG. 20, it is also possible to perform adjustment by temporally shifting a Y drive signal waveform. Thereby, an output timing for image validity signal S1 can be adjusted to a timing based on Y drive waveform L13a for adjusted Y drive signal waveform L13 from a timing based on Y drive signal waveform L12, which has not been adjusted.

Also, it is desirable that the adjustment amount in the scan drive control circuit 14 be stored in advance in a memory etc. for each scan speed of the scanner 4b or each pickup mode (for example whether the scan is a sparse scan or a normal scan etc.). For example, it can be stored in the storage 24 of the computer 20 or may be stored in a memory that the scan drive control circuit 14 has. Also, when only the adjustment amount at a particular scan speed is stored in advance, the adjustment amounts at different scan speeds may be calculated through calculations based on the stored adjustment amount.

While the present embodiment has shown an example in which the scanner 4b performs a reciprocal scan and the scanner 4a performs an one-way scan, the combinations of the scan schemes are not limited particularly. For example, both the scanner 4a and the scanner 4b may perform a reciprocal scan. Also, both the scanner 4a and the scanner 4b may perform a one-way scan. Further, the scanner 4a may perform a reciprocal scan while the scanner 4b performs an one-way scan. In any case, it is possible to suppress variations in image validity scopes caused by a response delay of the scanner 4b.

[Fourth Embodimen]

In a conventional scanning microscope, an image validity signal in the X directions (which will be referred to as an X image validity signal hereinafter) is output so that the middle of an X image validity period coincides with the middle of a forward movement period or a backward movement period (which will be referred to as a one-way period hereinafter).

The reasons line in the following assumptions. First, sampling clocks are generated in such a manner that the sampling positions are arranged at equal intervals. Further, the position sampled by the center sampling clock (which will be referred to as a center clock hereinafter) from among all the sampling clocks generated during a one-way period is located at the center of the scan scope, and the distribution of temporal directions of the sampling clocks is symmetrical with respect to the center clock. The reasons are that these assumptions allows a conclusion that by providing an X image validity period in such a manner that the center of the X image validity period coincides with the center of a one-way period, an image having not distortion and having its center at the center of the scan scope can be obtained.

However, the distribution of sampling clocks are not symmetrical with respect to the center clock in actuality. As a general rule, a sampling frequency in an early stage of a one-way period is lower than a supposed frequency and a sampling frequency in a later stage of a one-way period is higher than a supposed frequency. In other words, a sampling clock occurs with a delay. Various elements are thought to cause these phenomena. It can be thought that the fact of a clock generation circuit having different characteristics between a period with an increasing frequency of a sampling clock and a period with a decreasing frequency of a sampling clock may has influence. It can also be thought that a clock generation circuit has finite responsiveness, thus the rising portion cannot follow completely shortly past the returning point of the fully-rectified waveform when a sampling clock is generated by using a fully-rectified waveform and this fact has influence.

Figure 21:
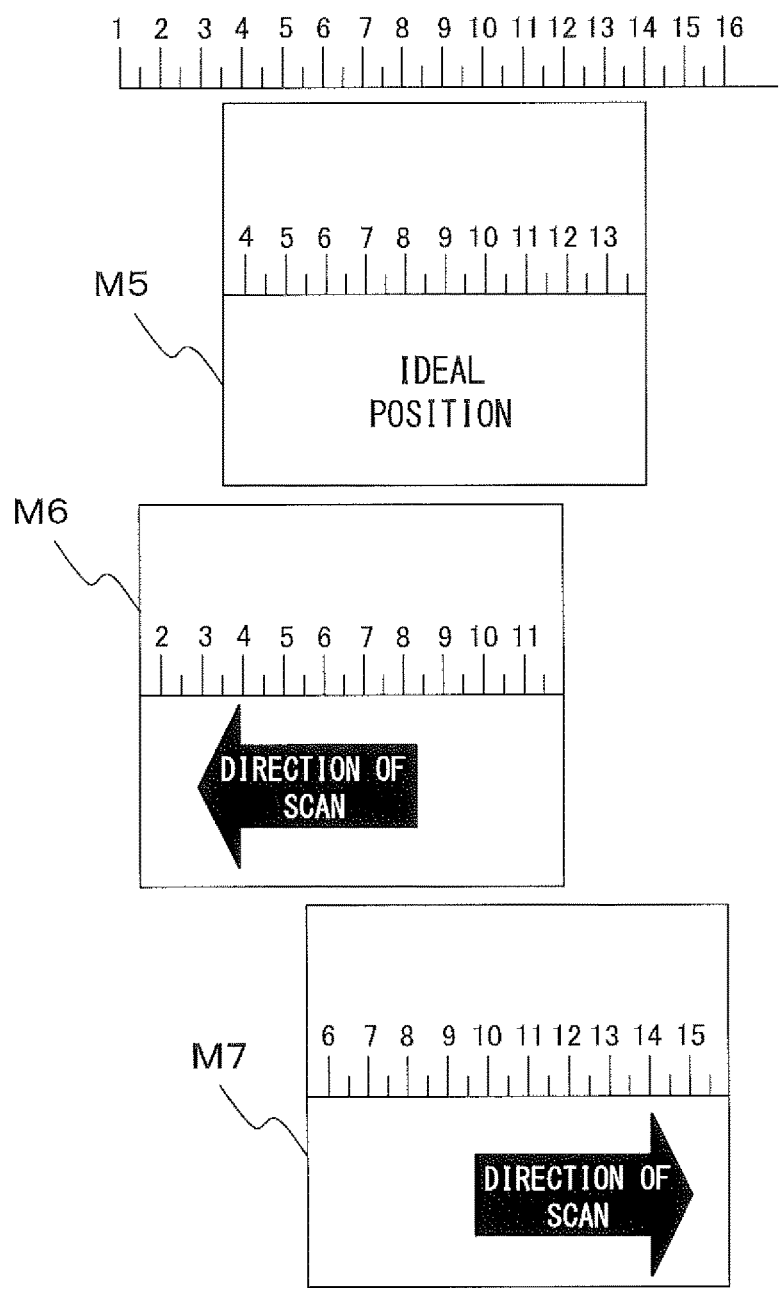
FIG. 21 explains variations in image validity scopes caused by a delay of a sampling clock.

Because of this, in a conventional scanning microscope, as shown in FIG. 21, images (images M6 and M7), which have the image validity scopes shifted from the ideal positions by delays of sampling clocks, are generated both in the X directional forward and backward movements. Also, because scans are performed in the opposite directions between the forward and backward movements, image M6 of the backward movement and image M7 of the forward movement have shifts that are in the opposite directions with respect to image M5 of the ideal position. Note that FIG. 21 explains variations in image validity scopes caused by a delay of a sampling clock.

The scanning microscope according to the present embodiment is different from the scanning microscope according to the second embodiment in that the scan drive control circuit 14 is configured to receive a sampling clock from the clock generation circuit 15 and to adjust an output timing for an X image validity signal of the scanner 4a for a waveform representing a temporal change of a frequency of a sampling clock (which will be referred to as a sampling waveform). In more detail, the scan drive control circuit 14 adjusts an output timing for an X image validity signal of the scanner 4a for a sampling waveform so that an image validity scope about the scan direction of the scanner 4a that is converted into an image during a forward movement period of the scanner 4a (which will be referred to as an X image validity scope) and an X image validity scope that is converted into an image during a backward movement period of the scanner 4a match.

Therefore, according to the scanning microscope of the present embodiment, even when a delay has been caused in a sampling clock, a desired scope can be converted into an image while maintaining the linearity of an image that easily deteriorates when a resonant scanner is used. It is also possible to suppress deterioration of image quality caused by a reciprocal scan.

Figure 22:
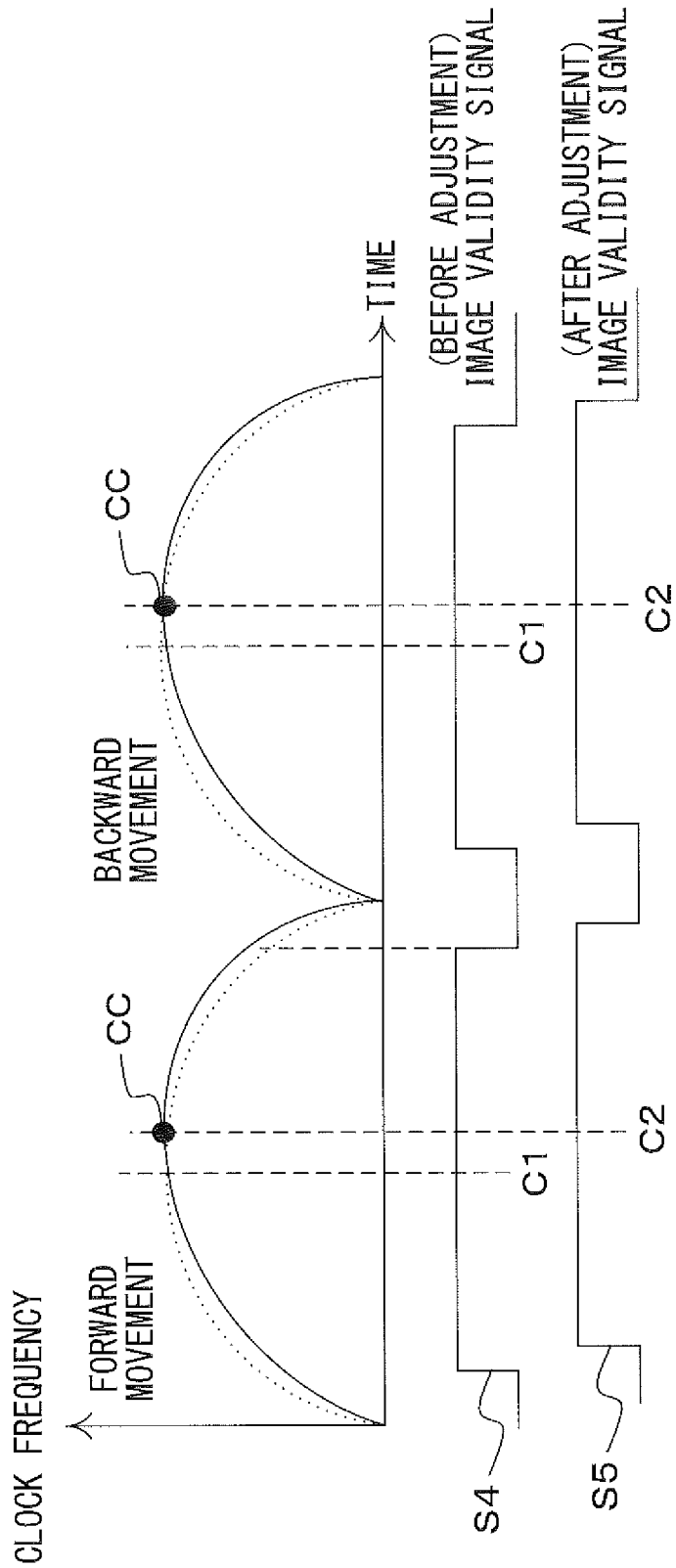
FIG. 22 explains a method of suppressing variations in image validity scopes caused by a delay of a sampling clock.

FIG. 22 explains a method of suppressing variations in image validity scopes caused by a delay in a sampling clock. The above adjustment is performed by temporally delaying an output timing for an image validity signal. Specifically, as shown in FIG. 22, an output timing for image validity signal S5, which has been adjusted, is delayed more than an output timing for image validity signal S4, which has not been adjusted. Note that the center of the period corresponding to image validity signal S4, which has not been adjusted, coincides with center C1 of the one-way period. By contrast, the center of the period corresponding to image validity signal S5, which has been adjusted, coincides with timing C2, at which center clock CC is occurs.

Note that the above adjustment is a technique that is completely different from a technique of shifting a phase of a sampling clock or an image validity signal with respect to a drive signal waveform (synchronization signal) of a resonant scanner, as described in Japanese Laid-open Patent Publication No. 2016-009157. The above adjustment technique is very effective in improving the linearity characteristic, which is a challenge for a resonant scanner.

Also, it is desirable that the adjustment amount in the scan drive control circuit 14 be stored in advance in a memory etc. for each scan speed of the scanner 4b or each pickup mode (for example whether the scan is a sparse scan or a normal scan etc.). For example, it can be stored in the storage 24 of the computer 20 or may be stored in a memory that the scan drive control circuit 14 has.

While the present embodiment has shown an example in which the scanner 4a and the scanner 4b perform a reciprocal scan, the combinations of the scan schemes are not limited particularly. For example, both the scanner 4a and the scanner 4b may perform an one-way scan. Also, the scanner 4a may perform a reciprocal scan while the scanner 4b performs an one-way scan. Further, the scanner 4a may perform an one-way scan while the scanner 4b performs a reciprocal scan. In any case, it is possible to suppress variations in image validity scopes caused by a delay of a sampling clock.

The above embodiments have shown specific examples in order to facilitate the understanding of the invention, and the embodiments of the present invention are not limited to the examples. The scanning microscopes and the control methods thereof allow various modifications and changes without departing from the claims.

Figure 23:
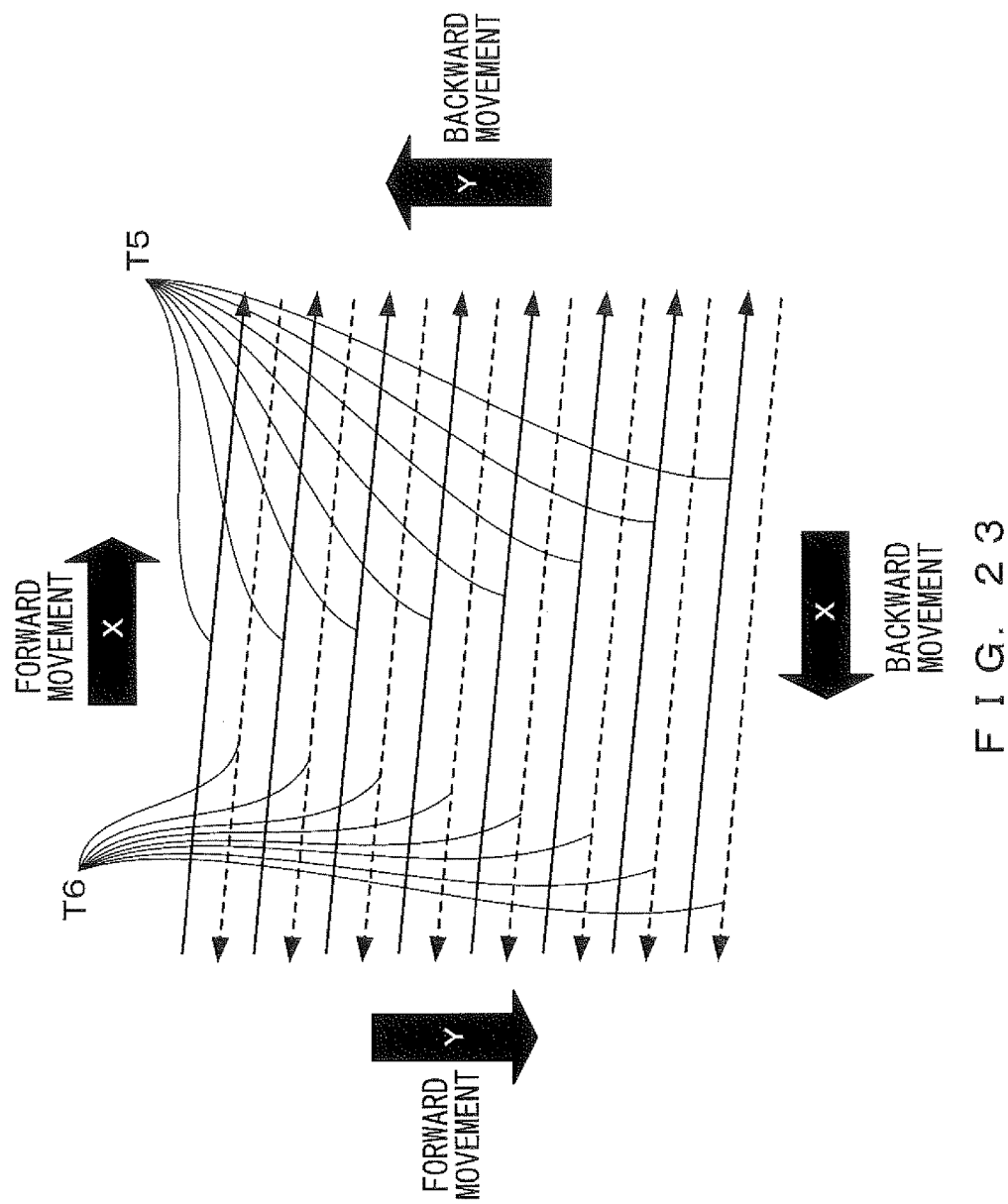
FIG. 23 shows sampling trajectories in forward and backward movements in a reciprocal scan in the Y directions.

For example, the third embodiment has shown an example in which the scan drive control circuit 14 adjusts an output timing for a Y image validity signal of the scanner 4b with respect to a drive signal waveform of the scanner 4b so that an image validity scope converted into an image during a forward movement period of the scanner 4b and an image validity scope converted into an image during a backward movement period of the scanner 4b match. However, as shown in FIG. 23, the scan drive control circuit 14 may adjust an output timing for a Y image validity signal of the scanner 4b with respect to a drive signal waveform of the scanner 4b so that sampling trajectory T5 of a forward movement period and sampling trajectory T6 of a backward movement period are intentionally shifted in order to provide different image validity scopes that are converted into images between the forward movement period and the backward movement period. In such a case, the resolution in the Y directions can be increased by generating one piece of image data by using both a signal sampled in a forward movement and a signal sampled in a backward movement.

What is claimed is:

1. A scanning microscope comprising:
   a two-dimensional scanning device that includes a first scanner and a second scanner for scanning, in oscillation motion and with light, a sample in directions orthogonal to each other, the first scanner scanning the sample at a speed higher than a speed of the second scanner;
   a scan controller that controls the two-dimensional scanning device;
   a photodetector that detects light from the sample scanned by the two-dimensional scanning device; and
   a sampling device that samples a signal from the photodetector in both a forward movement period and a backward movement period of the second scanner,
   wherein the scan controller adjusts an output timing for an image validity signal about a scan direction of the second scanner for a drive signal waveform of the second scanner so that an image validity scope about the scan direction of the second scanner that is converted into an image during the forward movement period of the second scanner and an image validity scope about the scan direction of the second scanner that is converted into an image during the backward movement period of the second scanner match.

2. The scanning microscope according to claim 1, wherein the scan controller controls the two-dimensional scanning device so that a scan trajectory during the forward movement period of the second scanner and a scan trajectory during the backward movement period of the second scanner correspond.

3. The scanning microscope according to claim 1, wherein the scan controller controls the two-dimensional scanning device so that the drive signal waveform of the second scanner is a triangle wave.

4. The scanning microscope according to claim 1, wherein the sampling device:
   samples the signal from the photodetector in one of a forward movement period and a backward movement period of the first scanner during the forward movement period of the second scanner, and
   samples the signal from the photodetector in the other of the forward movement period and the backward movement period of the first scanner during the backward movement period of the second scanner.

5. The scanning microscope according to claim 1, wherein the sampling device samples the signal from the photodetector in both a forward movement period and a backward movement period of the first scanner.

6. The scanning microscope according to claim 5, wherein the scan controller:
   controls the two-dimensional scanning device so that a position scanned during a period corresponding to the forward movement period of the second scanner and corresponding to a forward movement period of the first scanner is scanned during a period corresponding to the backward movement period of the second scanner and corresponding to a backward movement period of the first scanner, and
   controls the two-dimensional scanning device so that a position scanned during a period corresponding to the forward movement period of the second scanner and corresponding to the backward movement period of the first scanner is scanned during a period corresponding to the backward movement period of the second scanner and corresponding to the forward movement period of the first scanner.

7. The scanning microscope according to claim 1, further comprising an image data generator that generates image data of the sample based on of a digital signal output from the sampling device,
   wherein the image data generator:
      generates first image data based on of the digital signal output from the sampling device during the forward movement period of the second scanner, and
      generates second image data based on of the digital signal output from the sampling device during the backward movement period of the second scanner.

8. The scanning microscope according to claim 1, further comprising an image data generator that generates image data of the sample based on of a digital signal output from the sampling device, wherein:
the scan controller controls the two-dimensional scanning device so that a scan trajectory during the forward movement period of the second scanner and a scan trajectory during the backward movement period of the second scanner are different from the scan direction of the second scanner, and the image data generator generates image data based on of the digital signal output from the sampling device during the forward movement period of the second scanner and the digital signal output from the sampling device during the backward movement period of the second scanner.

9. The scanning microscope according to claim 1, wherein the scan controller shifts the image validity signal in a direction in which the image validity signal is temporally delayed.

10. A scanning microscope comprising:
a two-dimensional scanning device that includes a first scanner and a second scanner for scanning, in oscillation motion and with light, a sample in directions orthogonal to each other, the first scanner scanning the sample at a speed higher than a speed of the second scanner;
a scan controller that controls the two-dimensional scanning device;
a photodetector that detects light from the sample scanned by the two-dimensional scanning device; and
a sampling device that samples a signal from the photodetector in both a forward movement period and a backward movement period of the second scanner,
wherein the scan controller adjusts an output timing for an image validity signal about a scan direction of the first scanner for a sampling waveform that represents a temporal change of a frequency of a sampling clock so that an image validity scope about the scan direction of the first scanner that is converted into an image during a forward movement period of the first scanner and an image validity scope about the scan direction of the first scanner that is converted into an image during a backward movement period of the first scanner match.

* * * * *